United States Patent
Doken

(10) Patent No.: US 12,155,913 B2
(45) Date of Patent: Nov. 26, 2024

(54) SYSTEMS AND METHODS FOR LIGHT-WEIGHT NETWORKED VOLUMETRIC ASSET CONTROL

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 74 days.

(21) Appl. No.: 17/835,673

(22) Filed: Jun. 8, 2022

(65) Prior Publication Data

US 2023/0403443 A1 Dec. 14, 2023

(51) Int. Cl.
| | | |
|---|---|---|
| *H04N 21/81* | (2011.01) | |
| *H04L 9/00* | (2022.01) | |
| *H04L 9/32* | (2006.01) | |
| *H04N 21/84* | (2011.01) | |

(52) U.S. Cl.
CPC ......... *H04N 21/816* (2013.01); *H04L 9/3263* (2013.01); *H04L 9/50* (2022.05); *H04N 21/84* (2013.01); *H04L 2209/60* (2013.01)

(58) Field of Classification Search
None
See application file for complete search history.

(56) References Cited

U.S. PATENT DOCUMENTS

| | | | | |
|---|---|---|---|---|
| 2009/0263029 A1* | 10/2009 | Chang | ...................... | G06T 17/20 382/232 |
| 2019/0354698 A1* | 11/2019 | Pekelny | .............. | H04L 63/0853 |
| 2020/0242849 A1* | 7/2020 | Cini | ......................... | G06T 19/20 |
| 2022/0092848 A1* | 3/2022 | Chui | ........................ | G06F 16/78 |
| 2022/0207114 A1* | 6/2022 | Pfeifer | ................... | G06F 21/602 |
| 2023/0252687 A1* | 8/2023 | Zhang | ...................... | G06N 3/08 382/159 |

OTHER PUBLICATIONS

Tang et al. "VVSec: Securing Volumetric Video Streaming via Benign Use of Adversarial Perturbation" Poster Session B3: Multimedia System and Middleware & Multimedia Telepresence and Virtual/Augmented Reality, MM'20, Oct. 12-16, 2020, Seattle WA, USA.

(Continued)

*Primary Examiner* — Tapas Mazumder
(74) *Attorney, Agent, or Firm* — Haley Guiliano LLP

(57) ABSTRACT

Systems, methods and apparatuses are described herein for controlling access to 3D media assets. An attribute of an entity represented in a 3D media asset may be identified, and a modified version of the 3D media asset may be generated by modifying such attribute. A request to access at least a portion of the 3D media asset may be received from a client device. A determination may be made, based on a policy associated with the 3D media asset, to enable access to the at least a portion of such asset. In response to such determination, an indication of how to process the modified version of the 3D media asset to reconstruct such asset comprising the attribute as identified prior to the modifying may be transmitted to the client device. Such client device may be caused to generate for display such 3D media asset based on the processing.

20 Claims, 10 Drawing Sheets

(56) References Cited

OTHER PUBLICATIONS

Zerman et al., "Textured Mesh vs Coloured Point Cloud: A Subjective Study for Volumetric Video Compression," 2020 Twelfth International Conference on Quality of Multimedia Experience (QoMEX).
J. Liu et al., "Data-Adaptive Packing Method For Compression of Dynamic Point Cloud Sequences," 2019 IEEE International Conference on Multimedia and Expo (ICME).
Gül et al., "Low-Latency Cloud-Based Volumetric Video Streaming Using Head Motion Prediction," In 30th Workshop on Network and Op-erating System Support for Digital Audio and Video (NOSSDAV'20), Jun. 10-11, 2020, Istanbul, Turkey. ACM, New York, NY, USA, 7 pages. https://doi.org/10.1145/3386290.3396933.
Xiang et al. "Generating 3D Adversarial Point Clouds." In The IEEE Conference on Computer Vision and Pattern Recognition (CVPR). 2019.
Xiao et al. "MeshAdv: Adversarial Meshes for Visual Recognition." In Proceedings of the IEEE Conference on Computer Vision and Pattern Recognition (CVPR). 2019.
"Behind the Scenes of Madison Beer's Immersive Reality Concert" Jun. 5, 2021, https://youtu.be/ImaUc0mo0Mg.

* cited by examiner

- Vertices : 4,634
- Edges :13,872
- Faces : 9,248

- Vertices : 703
- Edges 2,106
- Faces : 1,401

Polygon (Volumetric) Mesh = Vertices + Edges + Faces
- Defines the shape of a polyhedral object
- Shape quantified as # of face meshes
- Different mathematical ways to construct

SYSTEMS AND METHODS FOR LIGHT-WEIGHT NETWORKED VOLUMETRIC ASSET CONTROL

BACKGROUND

This disclosure is directed to systems and methods for enabling access control of 3D media assets. In particular, a modified version of a 3D media asset may be generated by modifying an attribute of an entity represented in the 3D media asset. In response to determining to enable access to at least a portion of the 3D media asset, an indication may be transmitted to the client device of how to process the modified version of the 3D media asset to reconstruct the 3D media asset comprising the attribute as identified prior to the modifying.

SUMMARY

Volumetric capture is an emerging media area that records people, objects, and space in three dimensions (3D) with six degrees of freedom (6-DOF). At the end of the process, a 3D volumetric media asset is produced. Currently this is primarily a manual and specialized process carried out in special and well-equipped studios that utilize expensive specialized cameras. The generated assets can be used for a variety of applications including consumer or enterprise use cases, from holograms to collaborative education to interactive fashion to other immersive experiences that will eventually power the metaverse. Different from the pixel-based 2D and 360-degree videos, volumetric video captures 3D objects, represented by 3D meshes or point clouds, with significantly higher amounts of data and computation involved for capturing, storage, transmission, and rendering. Consequently, it poses significant challenges to the traditional video processing and streaming technologies. However, it is envisioned that volumetric streaming may become a common new generation application in the future, which may be as pervasive as today's common streaming services albeit providing much richer media experiences. For example, sports- or performance-related content may be provided as 3D volumetric assets, where replays of short segment videos may be offered to enable consumers to see the action as if they are at the venue, even in real time, and users have the option of navigating around the action as it is happening.

The current era might be considered the golden era of creators or influencers, where such users are being courted by new age media and tech companies to lure them into their platforms. However, there are challenges for the creators to gain traction due to long tail problem, i.e., already-famous creators capitalize on most of the eyeballs of other users versus upcoming creators. Newer media platforms, such as TikTok®, are trying to solve this problem by reversing other media platforms' algorithms and offering more spotlight to creators who are not yet popular but created viral content, to make it easier for them to be discovered. This approach initially was successful but also carries the seed of another emerging problem, that is, outlets ripping the content of such up-and-coming artists and broadcasting and/or monetizing such content as if it was their own. This problem is starting to cause damage because content owners may not always know where their content has been modified and who is reusing the content. The aforementioned issues are likely to exponentially scale in a future multiverse or metaverse environment where most content may be in 3D and/or may be costly and complex to produce, and thus the value of creator and content may become even greater than it is today.

Once the 3D volumetric assets are generated, confidentiality of such assets becomes a critical issue, since each asset represents a digital twin of its subject that could be used for a variety of unintended applications/purposes different from those originally conceived by the asset owner and/or the subject of the volumetric asset. If leaked, such assets may cause significant financial, reputational, and/or personal damage to the owner of the 3D asset. Some possible examples of misuse of or threats involving 3D volumetric assets, from the perspective of the asset owner, may include unauthorized alteration of parts of the asset to create mutated digital twins; nefarious interests in manipulating consumers' understanding and perception of reality; insertion of portions of the asset into a so-called Holo-Editor by non-owners for modification; scraped portions (e.g., faces, sub 3D models) of assets for the unauthorized unlocking of biometric systems or revealing privacy sensitive objects; deliberate quality degradation of the asset; undesired cross 3D asset relationship construction; unauthorized 3D asset access and payload attack during streaming; and reverse engineering and stealing of trade secrets. Moreover, due to the complexity of capturing and storing volumetric 3D assets, such assets may be considered to be significantly more valuable assets than 2D or 360-degree video content from an economic perspective.

In one approach, brute force end-to-end encryption (E2EE) of all 3D Volumetric video assets is employed at all times to address some of the above-mentioned concerns. While such technique is valid, E2EE being performed at all times is computationally intensive, particularly during streaming or live streaming of 3D volumetric content. Moreover, such method may be impractical or non-implementable (due to E2EE transmission and processing delays) for future interactive applications that may require very low latency, such as metaverse applications, MMOG (Massively Multiplayer Online Gaming), augmented reality (AR), virtual reality (VR) and/or similar co-presence or socially collaborative applications that may involve 6-DOF immersivity. Accordingly, there is a need to provide security and media control for such assets before such assets can be widely deployed for ubiquitous and consumer-facing applications while minimizing the use of computing and/or network resources in performing such media control. Otherwise, adoption of 3D volumetric video and streaming technology by consumers and/or enterprises may lag or even may not happen at all in certain circumstances.

Apparatuses, systems and methods are provided herein for overcoming these drawbacks. Implementing any of the one or more of the techniques described herein, a system or systems may identify an attribute of an entity represented in a three-dimensional (3D) media asset, generate a modified version of the 3D media asset by modifying the attribute of the entity, and receive, from a client device, a request to access the 3D media asset. The system(s) may determine, based on a policy associated with the 3D media asset, whether to enable access to at least a portion of the 3D media asset. The system(s) may, in response to determining to enable access to at least a portion of the 3D media asset, transmit to the client device an indication of how to process the modified version of the 3D media asset to reconstruct the 3D media asset comprising the attribute as identified prior to the modifying. The system(s) may cause the client device to generate for display the 3D media asset based on the processing of the modified version of the 3D media asset.

Such aspects enable providing a multi-tiered, multi-pronged approach to volumetric video asset control and enable implementing a policy to put asset owners in the driver's seat for controlling access rights and confidentiality of the asset from a privacy and security perspective during volumetric content streaming or other 3D media asset streaming. Such features may provide network-enabled 3D volumetric asset control, post capture, to the asset owner to preserve the structure and integrity of the asset during a video-on-demand (VOD) or live volumetric streaming session, and/or may provide an asset owner with the capability of applying polices to 3D assets at a granular level. In some embodiments, such features may enable cloaking of critical parts of the 3D volumetric media asset, streaming of authentic parts of the 3D volumetric asset, e.g., out-of-band via certification, and policy control of the asset by the asset owner (including 6-DOF movement granularity). Such features may enhance the efficiency of securely managing 3D media assets, such as by minimizing the use of computational resources to cloak and/or encrypt the 3D media asset, and may allow for tracking of unauthorized use of 3D media assets and/or degradation of the user experience of modified versions of such assets. Such cloaking or modifying of the 3D media asset may be implemented in a manner that subtly changes the 3D media asset such that the modified 3D media asset appears authentic to potentially unauthorized consumers, and allows the asset owner to verify stolen or unauthorized use of 3D media assets, unbeknownst to such consumers. Such approach may enable attention to be paid to the 3D media asset owner or creator rights, incentives and policy perspective with respect to a client media player, transmission topology and authentic and modified versions of the 3D media asset, to help protect the time and money investment into 3D asset creation.

In some embodiments, the 3D media asset is a volumetric media asset, and the entity is a digital representation of a person, an object or a structure.

In some aspects of this disclosure, the entity is a digital representation of a person, and the attribute corresponds to one or more liveliness features related to movement of one or more portions of the digital representation of the person in the 3D media asset.

In some embodiments, the system(s) may be further configured to generate metadata for the modified 3D media asset that comprises the indication, wherein the indication specifies a portion of the modified version of the media asset at which the modified attribute is presented. The metadata may specify the attribute as identified prior to the modifying, and the metadata is indicated in a manifest file usable to play the 3D media asset.

In some aspects of this disclosure, the system(s) may be further configured to encrypt the metadata prior to transmission to the client device, and generate a hash generated checksum with respect to the modified version of the media asset and the metadata. The system(s) may determine to enable access to the at least a portion of the 3D media asset by determining that a checksum operation performed based on the hash generated checksum is successful.

In some embodiments, the metadata further comprises an indication of one or more characteristics of equipment used to capture imagery used for generating the 3D media asset or one or more characteristics of an environment in which the imagery was captured. In some aspects of this disclosure, the one or more characteristics of the equipment comprise at least one of an indication of a location of a camera in the environment, a location of a microphone in the environment, or a geometry of the camera.

In some embodiments, the system(s) may be further configured to embed a seed certificate into the 3D media asset, wherein the seed certificate comprises the policy associated with the 3D media asset. The system(s) may determine, based on the policy associated with the 3D media asset, whether to enable access to the at least a portion of the 3D media asset by determining whether a license has been received that indicates, based on the policy, whether access to the at least a portion of the 3D media asset is enabled. The system(s) may, in response to determining the license has not been received, causing the modified version of the 3D media asset to be displayed at the client device.

In some aspects of this disclosure, the policy indicates one or more of permitted consumption of the 3D media asset; permitted transmission of the 3D media asset for a particular server; permitted consumption of the 3D media asset for a requesting device type; permitted consumption of the 3D media asset for particular capabilities of a requesting device; time duration limitations associated with the 3D media asset; number of render limitations associated with the 3D media asset; or six degrees of freedom (6-DOF) movement capability limitations with respect to the 3D media asset.

In some embodiments, the policy indicates a particular portion of the 3D media asset should be excluded, and based on the policy, the system(s) may be further configured to cause the particular portion of the 3D media asset not to be displayed at the client device.

In some aspects of this disclosure, the system(s) may be further configured to, in response to determining, based on the policy, not to enable access to the 3D media asset, cause the client device to generate for display the modified version of the 3D media asset with a gradual degradation cycle. In such gradual degradation cycle, audio and/or visual attributes of the modified version of the 3D media asset may be gradually degraded for a period of time and display of the modified version of the 3D media asset may be ceased after the period of time.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
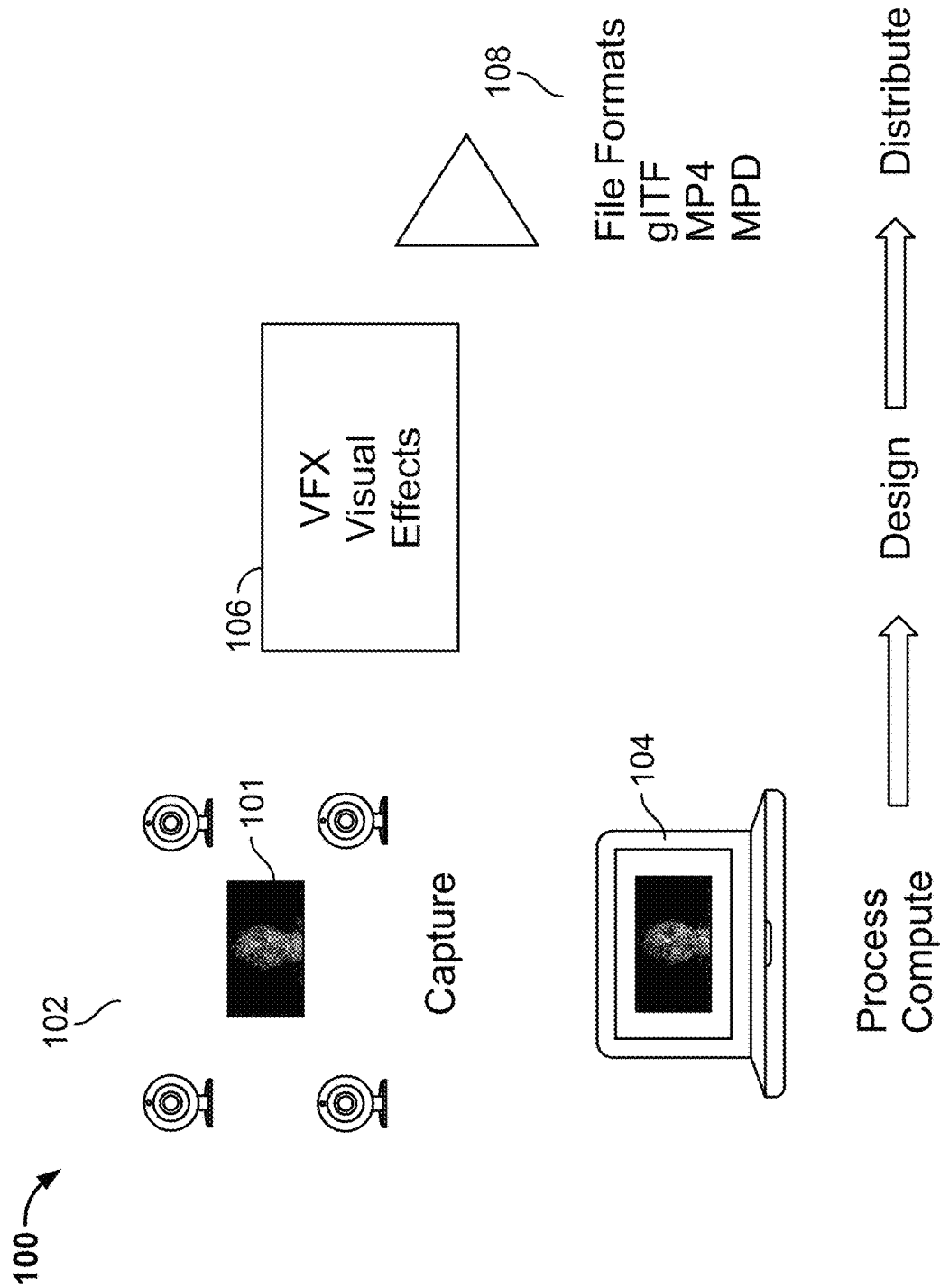
FIG. 1 shows an illustrative workflow for generating a 3D media asset, in accordance with some embodiments of this disclosure.

FIG. 1 shows an illustrative workflow 100 for generating a 3D media asset, in accordance with some embodiments of this disclosure. As referred to herein, the term "media asset" may be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), 3D content, 3D volumetric content, holographic content, video clips, audio, playlists, websites, articles, electronic books, blogs, social media, applications, games, and/or any other media or multimedia, and/or combination thereof.

Workflow 100 may comprise steps 102, 104, 106, 108, and/or any other suitable processing step(s). At step 102, equipment, such as, for example, any suitable number of sensors (e.g., 3D cameras, image sensors, LiDAR sensors, infrared cameras, wearable sensors, haptic sensors, or any combination thereof, and/or any other suitable sensor(s)) may be employed. Such sensor(s) may be positioned at an array of locations, and/or light sources, and may be used to capture images or other sensor signals related to a scene or subject. For example, such equipment may be used to capture images and/or other sensor signals representative of a location, appearance and/or movements of entity 101, from any suitable number of perspectives, via respective sensors distributed at different locations within an environment. In some embodiments, at least a portion of such multiple perspective views may be captured simultaneously at particular time points. Such different perspectives of entity 101 may be captured at a stage and/or studio (e.g., studio 200 of FIG. 2; including equipment to capture imagery and generate 3D media assets, such as, for example, volumetric 3D media assets, by reconstructing a digital representation of entity 101 from the various captured perspectives). Additionally or alternatively, imagery captured at 102 may be captured by way of a user device or any other computing device, e.g., a smartphone or tablet, equipped with a camera and/or other sensor(s). As used herein, an entity may be understood as a person, an animal, an object, a structure, a landmark, a machine, terrain, topographical feature, or any other suitable portion or characteristics (e.g., movement or dance moves of a person) thereof, or any other suitable feature of an environment capable of being captured and processed as part of a 3D media asset, or any combination thereof. A 3D media asset may comprise any suitable number and combination of entities. As non-limiting examples, the entity may correspond to a volumetrically captured person, such as an influencer, celebrity, artist, statesperson, politician, etc.; or an object, such as a work of art, merchandise, product, item, drawing, etc.; or a structure such as a manufacturing facility, a museum or other building or a restricted-access location or any other suitable structure.

At step 104, the imagery captured via the sensors from multiple sensors may be processed and combined to generate a 3D model. For example, the imagery captured at 102 may be represented by way of a computed 3D mesh or 3D point cloud, e.g., a set of coordinates in a three-dimensional coordinate system that represents the external surface of an object, and that may contain depth information for each volume pixel (voxel) of the imagery. For example, each voxel may be a cube comprising X-axis coordinates, Y-axis coordinates and Z-axis coordinates (e.g., depth information) of the captured imagery. In some embodiments, color information and depth information (RGB-D), and/or spatial information and/or texture information and/or reflectance information and/or any other suitable information may be specified for each voxel over any suitable number of frames of the 3D media asset to be generated based on the captured imagery. At 106, visual effects may be applied to the imagery represented by way of the 3D point cloud, e.g., to adjust or calibrate certain features of the imagery, and/or any other suitable processing.

Figure 3:
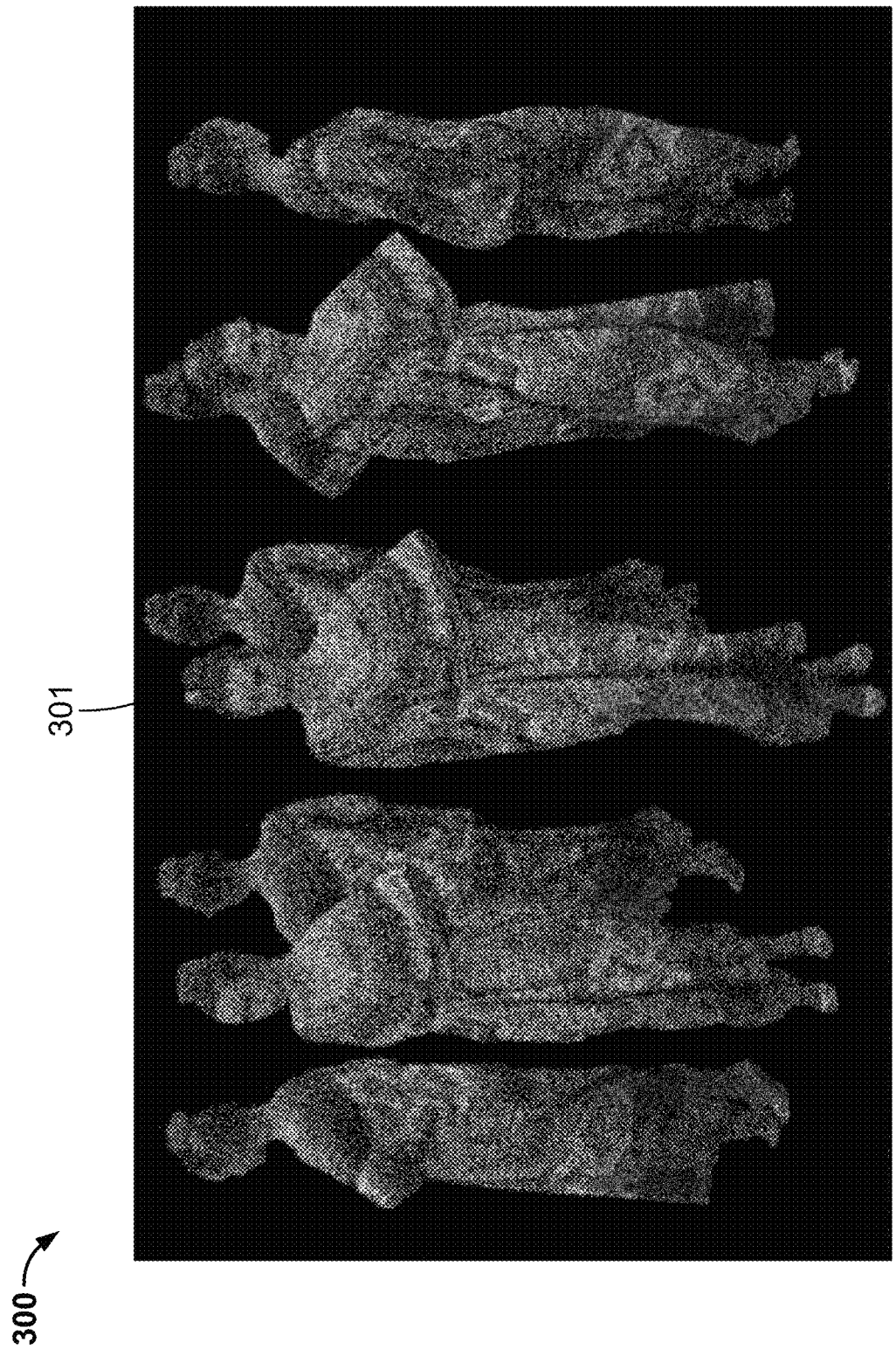
FIG. 3 shows an illustrative 3D media asset, in accordance with some embodiments of this disclosure.

At 108, a 3D media asset, e.g., a volumetric 3D media asset such as media asset 300 shown in FIG. 3, may be generated. In some embodiments, the volumetric 3D media asset may be generated in any suitable file format, e.g., gITF, MP4, MPD, etc. In some embodiments, the 3D media asset may represent a digital twin of entity 101 having been captured via the multiple sensors from the multiple perspectives and angles. In some embodiments, the 3D media asset may comprise a 3D avatar or other digital representation of entity 101 and/or other real-world scene. The media asset may be distributed to and rendered by a display device (e.g., 3D display device 815 of FIG. 8) capable of rendering volumetric 3D media assets. The display device may render one or more entities, and/or other content, of the 3D media asset such that a user consuming the 3D media asset may view the entity from any perspective, and/or zoom in on or otherwise manipulate specific portions of the 3D media asset. In some embodiments, voxels of the 3D media asset may be generated in physical space via light emission or light scattering, e.g., without a physical screen.

In some embodiments, the owner of the generated 3D media asset 300 may correspond to one of the entities digitally represented in 3D media asset 300. For example, if entity 101 depicted in 3D media asset 300 is a person, such person may also be the owner of 3D media asset 300, or if entity 101 is building, an entity that owns such building may be the owner of the 3D media asset. As another example, entity 101 may assign his or her ownership to another entity, e.g., another person, a company, a governmental organization, or any other suitable entity or any combination thereof. As another example, a digital twin 3D asset of an offshore Asian manufacturing facility may be owned by a U.S.-based company.

Figure 4:
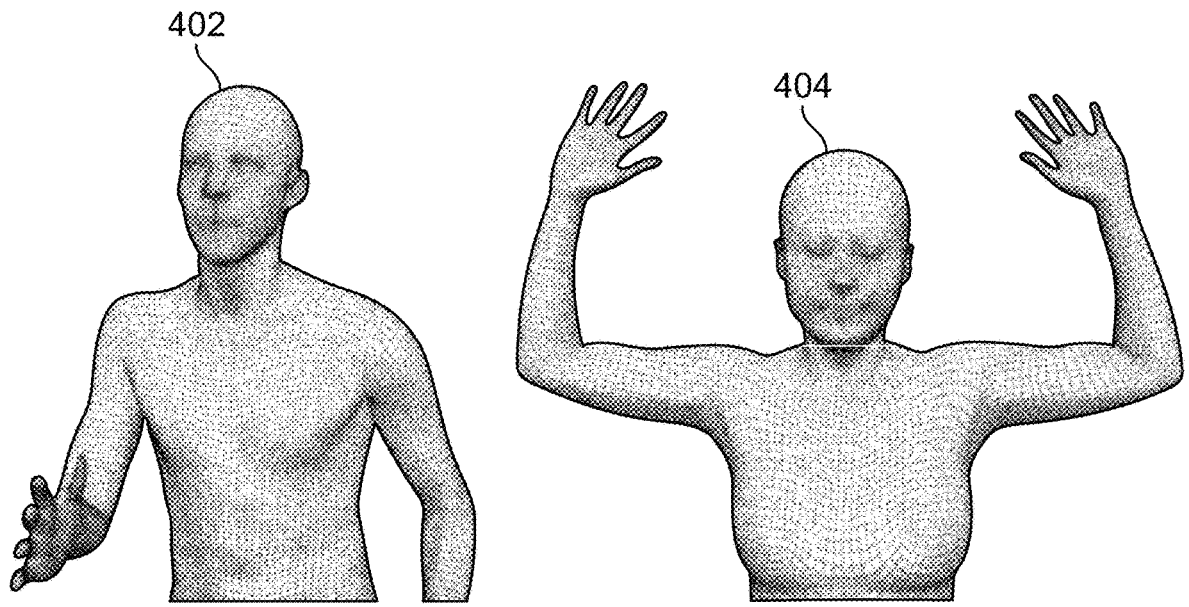
FIG. 4 shows an illustrative entity of a 3D media asset, in accordance with some embodiments of this disclosure.

FIG. 4 shows an illustrative entity of a 3D media asset, in accordance with some embodiments of this disclosure. In some embodiments, a media control application may be executed by the system(s) described herein to implement the functionalities described above and below. The media control application may be configured to modify or cloak one or more portions of 3D media asset 300 as part of a multi-tiered, multi-pronged approach for volumetric video asset control, to enable the content owner to control the rights and confidentiality of the 3D media asset from perspective a privacy and security perspective, during volumetric content streaming. The media control application may identify certain attribute(s) of entity 301 represented in 3D media asset 300 of FIG. 3. For example, certain portion(s) of 3D media asset 300 may be relatively more important than others to the asset owner, such as based on the fact that such portion(s) may be more vulnerable to misuse or threats involving 3D volumetric assets such as described above. As an example, basic biometric aspects of the 3D asset may be of higher value to the asset owner, such as a face of depicted entity 301, an eye and/or iris of depicted entity 301, spatially captured voice tone and/or voice pitch of entity 301, or any other suitable attribute of entity 301, or any combination thereof. In some embodiments, the media control application may identify attribute(s) at any suitable level of granularity, such as, for example, only a sub-portion of the face of entity 301 (e.g., a nose or an ear or any other suitable sub-portion of any combination thereof), which may uniquely identify entity 301. For example, if entity 301 is a celebrity who is well known for having a mole at a particular portion of his or her face, the owner of 3D media asset 300 may desire to prevent the depiction of such mole from being tampered with or modified, such as by way of the point cloud data corresponding to 3D media asset 300. To pre-empt such a threat, the media control application may be configured to generate a modified or baseline 3D media asset without such identified attributes, such that the identified attributes (e.g., critical or valuable portions of entity 301) may be cloaked. In some embodiments, the media control application may generate a metadata layer accommodating such features and/or comprising an indication or identification of such cloaked feature(s).

In some embodiments, one or more of the attributes may be identified based on a selection of a user, e.g., an owner of 3D media asset 300. The media control application may provide a user interface that permits a user to select (e.g., via a touch screen or mouse or voice command and/or via any other suitable input) or particular portion(s) of entity 301 as the identified attribute for modification as part of the media asset control process, as opposed to other portions. In some embodiments, to identify the entity or entities and/or attribute(s), the media control application may be configured to generate and/or analyze metadata of 3D media asset 300, which may specify locations or positions within a frame, and identities, of particular entities and/or sub-portions thereof. In some embodiments, to identify the entity or entities and/or attribute(s), the media control application may perform audio processing and/or visual processing on frames of 3D media asset 300 to identify locations or positions within a frame, and identities of, particular entities and/or sub-portions thereof. For example, the media control application may employ image segmentation (e.g., semantic segmentation and/or instance segmentation) and classification to identify and localize different types or classes of entities in portion(s) of the 3D media asset. Such segmentation techniques may include determining which pixels or voxels belong to a depiction of entity 301, and/or which pixels should be mapped to a particular attribute, e.g., a facial feature (e.g., head, nose, ear, eyes, shoulder, mouth, etc.) or any other suitable attribute or feature of entity 301. The segmentation technique may include determining which pixels belong to a physical environment surrounding entity 301 and/or may include determining which pixels belong to other entities within a frame of 3D media asset 300.

The media control application may, to identify entities and/or attributes, identify a shape of entity 301, and/or boundaries (e.g., edges, shapes, outline, border) at which the depiction of entity 301 ends and/or analyze pixel or voxel intensity or pixel or voxel color values contained in frames of the video feed. The media control application may be configured to employ machine learning, computer vision, object recognition, pattern recognition, facial recognition, image processing, image segmentation, edge detection, or any other suitable technique or any combination thereof. In some embodiments, the media control application may identify entities and/or attributes thereof based at least in part on analyzing the location and shape of point cloud coordinates. The media control application may employ color pattern recognition, partial linear filtering, regression algorithms, and/or neural network pattern recognition, or any other suitable technique or any combination thereof, to identify entities and/or attributes.

In some embodiments, the media control application may recommend certain portions of entity 301 or other portions of 3D media asset 300 for selection as the attribute to be modified. For example, such recommendation may be based on historical user selections of the asset owner or other similarly situated asset owners, and/or based on any other suitable information, e.g., referencing a database, analyzing websites or social network history to determine a critical portion of media asset 300. In some embodiments, a particular audio portion of 3D media asset 300 may be identified for modification. For example, a certain audio portion (e.g., one second or any other suitable length of portion of the audio) may be modified or removed from the original version of the 3D media asset as part of the cloaking process.

As shown in FIG. 4, the media control application may be configured to obtain a polygonal representation of entity 301 indicating exterior and interior structures of entity 301, where entity 301 of FIG. 3 may correspond to entity 402 or entity 404 of FIG. 4. For example, the polygonal representation or volumetric mesh may comprise indications of vertices, edges and faces for each of detected entity 402 and 404, and may be computed based on the point cloud for the 3D media asset 300. Such vertices, edges and faces may define the shape of each polyhedral object in 3D media asset 300, and the shape may be quantified as the number of face meshes, where such features may be computed using any suitable technique. In some embodiments, such volumetric mesh may be utilized by the media control application in identifying certain features of the digital representation of the entity rendered in the media asset. In some embodiments, the asset owner may be provided with a user interface permitting specification of certain portions of the volumetric mesh for modification as part of the cloaking process. Such volumetric mesh may be used as part of the capture and encoding of a human 3D volumetric asset, and/or may be used to capture and encode any suitable type of entity represented in the 3D media asset.

The media control application may be configured to generate a modified version of 3D media asset 300 based on the identified attribute, e.g., by modifying the attribute of entity 301 specified by the asset owner or otherwise identified, using any suitable technique. For example, the media control application may generate the modified or baseline 3D media asset by removing the identified attribute from the original version of the 3D media asset or otherwise altering the attribute (e.g., by modifying a size, shape, location, appearance or other characteristic(s) of the attribute). The media control application may determine the vertices, edges, faces, and/or beamformed spatial audio of one or more frames of the modified version of 3D media asset 300. For the particular identified attribute(s), e.g., the 2D or 3D portion specified by the asset owner, the media control application may set such attribute as blank or with a specific pattern (e.g., as a signature #DEADBEEF or specially coded or any other suitable pattern) during an encoding phase of the modified version of media asset 300. In some embodiments, such specific coding may be applying an offset to the depth parameter or any other suitable parameter or attribute of the modified version of 3D media asset 300, which may be a minor offset which is difficult or impossible for a human observer to perceive. In some embodiments, the media control application may provide the user (e.g., asset owner)

with the capability of specifying his or her own patterning methodology or with the ability to select one or more of the above-mentioned patterns.

In some embodiments, the media control application may generate a separate container, e.g., metadata, for such blank or cloaked or specially coded section, where such container may comprise, or otherwise indicate, the authentic data (e.g., the identified attribute, as present in 3D media asset 300 prior to the modification of 3D media asset 300). For example, the metadata container may specify a portion (e.g., a particular frame and/or location) within the modified version of media asset 300 at which the modified attribute is presented and specifies the attribute as such attribute was identified prior to the modification. Such metadata may comprise an indication or instructions to a 3D media asset renderer of how to process the modified version of the 3D media asset to reconstruct the 3D media asset comprising the attribute as identified prior to the modifying. In some embodiments, such metadata container may be encrypted separately from encryption of the modified version of 3D media asset 300, using any suitable encryption protocol (e.g., AES-128 and/or any other suitable technique).

In some embodiments, the media control application may employ one or more cryptographic techniques (e.g., hashing algorithms, hash generated checksums, digital signature generation, keyed-hashing for message authentication, generation of shared keys and/or public-key pairs, and/or any other suitable technique) as part of an authentication method. For example, such techniques may be employed for authentication purposes as between the baseline or modified version of 3D media asset 300 and the metadata layer. In some embodiments, such techniques may be applied prior to or subsequent to encryption of the metadata and/or modified version of the 3D media asset. In some embodiments, a hash value for the metadata container and/or the modified version of the 3D media asset may be generated by inputting data indicative of the metadata container (and/or the modified version of the 3D media asset) into a hash function (e.g., SHA-1, SHA-2, or SHA-256). The cryptographic hash function may accept an arbitrary length string and output a hash or fingerprint of fixed length string of characters (e.g., numeric or alphanumeric) and which is deterministic, e.g., the same output is yielded for the same repeated input.

In some embodiments, the output hash value representing the metadata container may be combined with or hashed with data representing at least a portion of the modified version of 3D media asset 300, and may be encrypted by a private key at a server (e.g., server 602 of FIG. 6) to generate a digital signature. A client receiving device (e.g., renderer 508 of FIG. 5), having requested access to at least a portion of the 3D media asset, may use a public key (associated with the private key and/or received from the server) to decrypt the received data, and may extract the hash value. Each public key and private key may comprise respective strings of numeric characters or alphanumeric characters. In some embodiments, a message that is encrypted with one of the public key or the private key can only be decrypted with the other of the public key or the private key, and a message that is encrypted with the public key or the private key can only be decrypted with the other of public key or private key. The client receiving device may compute a hash value by inputting the decrypted data into the same hash function used by the server. The client receiving device may authenticate and verify the metadata and modified 3D media asset correspondence upon determining the computed hash value matches the extracted hash value, e.g., determining the checksum operation is passed. On the other hand, if the computed hash value does not match the extracted hash value, the checksum operation may fail, and reconstruction of the original media asset may be prevented. The media control application, upon determining that the checksum operation has failed, may permit access to the modified version of the 3D media asset only for a predefined period of time, and/or the 3D media asset owner may be notified of the failed checksum operation, which may be indicative of an unauthorized user.

Figure 2:
FIG. 2 shows an illustrative environment for capturing imagery for a 3D media asset, in accordance with some embodiments of this disclosure.

In some embodiments, identification and/or selection of a portion or sub-portion of 3D media asset 300 that is to be modified may be based on liveliness features related to movement of one or more portions of the digital representation of entity 301 in 3D media asset 300. For example, at a time that is post-capture and pre-encoding, the media control application may perform any suitable processing (e.g., texture analysis) over facial regions or any other suitable regions of 3D media asset 300. Based on such processing, the media control application may determine differences and properties of the optical flow of light during the video capture, e.g., from frame to frame, and/or build a histogram of, or any other suitable data structure indicative of, eye and/or lip (or other suitable body part) movement or other liveliness features (e.g., pupil dilation). For example, the media control application may compute color and/or texture histograms, and/or may employ a number of processes as part of the histogram comparison including edge detection, scaling, color comparisons, and/or other processes. In some embodiments, the media control application may perform variable focus analysis, or any other suitable processing, with respect to the variation of voxel or pixel values between frames. In some embodiments, the media control application may determine that one or more of the attributes to be modified belong to an entity that is not a person (e.g., an object or structure, etc.) and the processing may identify portions of such entity that may be moving (e.g., a blade of a windmill and/or any other feature of any suitable attribute). The media control application may be configured to modify certain of the collected liveliness data with a different pattern. For example, the media control application may modify an eye blinking frequency, a height or angle a dancer generally jumps (as shown in FIG. 2), and/or any other suitable attribute or parameter, and the original value (e.g., prior to the modification) may be recorded and stored as part of the separate metadata container.

In some embodiments, the liveliness features of one or more entities and/or portions thereof may correspond to 6-DOF movement of certain portions of 3D media asset 300, e.g., how much forward or backward an artist or dancer was able to bend during a performance, the extent and/or boundaries a virtual sword can or does cut through a virtual body in a game, etc. In some embodiments, the media control application may recommend certain attributes for selection by the asset owner that are determined to be relatively less complex to extract and process. For example, particularly in a live streaming session, e.g., of a 3D volumetric media asset, it may be desirable to identify and select for modification an attribute pattern that is relatively simple to process. On the other hand, if at least a portion of the 3D media asset is being accessed on demand or offline, the user may be afforded the option to identify and select more complex patterns for extraction by the media control application. In some embodiments, the media control application may train and employ one or more machine learning models (e.g., a convolutional neural network and/or any other suitable model(s)) to identify a particular media asset as a live production asset. For example, such machine learning model(s) may be trained using collected data for a volumetric capture duration or during a time frame during which an identified or selected attribute to be modified is present in a particular frame.

In some embodiments, the liveliness features of one or more entities and/or portions thereof to be modified may correspond to a particular gesture, e.g., a signature move widely known and associated with a particular celebrity, such as Kapernicking or Tebowing, each associated with a professional athlete (e.g., a unique touchdown celebration or a pregame ritual). Such signature move may be modified, e.g., in a subtle way not noticeable or difficult to notice by an observer, as part of the cloaking process. As another example, a particular individual may be associated with a signature laugh, which may be modified as part of the cloaking process. It may be desirable to perform cloaking or modification of such a signature move or gesture because if such gesture is volumetrically captured, it may be undesirable for the asset owner for such movements to be modified or tampered with by nefarious users. Moreover, such users may desire to protect their potentially large time and financial investments with respect to generating the 3D media asset and the authenticity of the gesture and the capture. For example, a subtle change may be made to such gesture as part of the modification of the gesture, which may not be noticeable to a nefarious user having acquired the 3D media asset in an unauthorized manner. As another illustrative technique, the media control application may detect certain biometric data, e.g., blood flowing in a subject of the 3D media asset, and such information may be extracted and inserted into the metadata container. Such information may be removed from the 3D media asset as part of the cloaking process, which may be a subtle change not noticeable to an observer and which may be hard to detect and may be computationally light to implement.

Additionally or alternatively, the media control application may be configured to identify and/or receive selection of one or more attributes or parameters that may be added to the metadata container and used by a receiving device as part of an authentication process. Such attribute(s) may correspond to an indication of characteristic(s) of equipment used to capture imagery used for generating the 3D media asset (e.g., number, resolution and/or location, position or geometry of the capturing (passive or active) cameras or lasers or microphones within the environment, data from wearable sensors and/or any other suitable characteristics). As another example, such attribute(s) may correspond to one or more characteristics of an environment in which the imagery was captured (e.g., lighting, shadowing, diffusion or conditions during the capture session, such as at the studio of FIG. 2, a location of the capture, and/or any other suitable characteristics). For example, such information may be used as part of a process of generating a hash value representing the metadata container, and an unauthorized user may be unable to decrypt or pass a checksum operation with respect to the metadata container and modified 3D media asset. Without having knowledge of the information in the metadata, the unauthorized user may be unable to access or reconstruct the original version of the 3D media asset, e.g., the metadata may be encrypted and usable to reconstruct the original version of the media asset, and the unauthorized user may be unable to decrypt the metadata and/or pass the checksum operation.

The modification of the identified attribute(s) of 3D media asset 300 may be configured to be a minimal and subtle change, such that a user not authorized to be in possession of the modified version of media asset 300 perceives the media asset in its original form and does not suspect that the media asset has been altered or modified. The asset owner may track usage of such modified version of 3D media asset 300, as the unauthorized user may be likely to distribute or use the modified version of media asset 300 without restraint. This may be because the unauthorized user likely believes the modified version of media asset 300 is in fact the original version, and thus that he or she will not be caught or suspected of the unauthorized use of such asset.

In some embodiments, the media control application may employ other cloaking tools, e.g., color manipulation, changing frame rate and/or packing and/or padding, geometry manipulation, texture padding, swapping pixels locally, or any other suitable tool, as part of the modification process. Such tools may be employed in a subtle but effective manner so as to ensure that the modification of such parameters or attributes is not noticeable to the unauthorized party and is selected and modified intelligently, and the asset appears to play normally to such unauthorized party, while enabling the asset owner to detect and track behavior with respect to the modified version of the media asset. For example, the media control application may count how many times the modified version of the asset was rendered, and determine when or how to enforce the asset owner's content rights. Moreover, such approach may minimize the complexity of the processing for performing the modification of the attribute, and/or reconstruction of the original attribute by a receiving device.

In some embodiments, the media control application may be configured to embed a seed certificate within 3D media asset 300, e.g., during a phase in which the 3D media asset is generated. Such seed certificate may include a baseline policy of how 3D media asset 300 can be used as default and/or any other suitable information, e.g., a default hardcoded certificate server address. It should also be understood that, in instances where an entity of the volumetric asset is not a human but a specific object, another attribute of that entity (e.g., a 3D digital representation of the object) may be cloaked in a similar manner as described above. For example, such modification or cloaking may be performed in a subtle manner that may only be known and/or detected by the asset owner, since such modification or cloaking may be tightly correlated to characteristics of the 3D volumetric asset capture environment and configuration thereof. As an example, the media control application may volumetrically capture each room of the White House or just the Oval Office or another famous venue, while cloaking certain private, confidential sections for any reason determined by the asset owner (e.g., national security).

Figure 5:
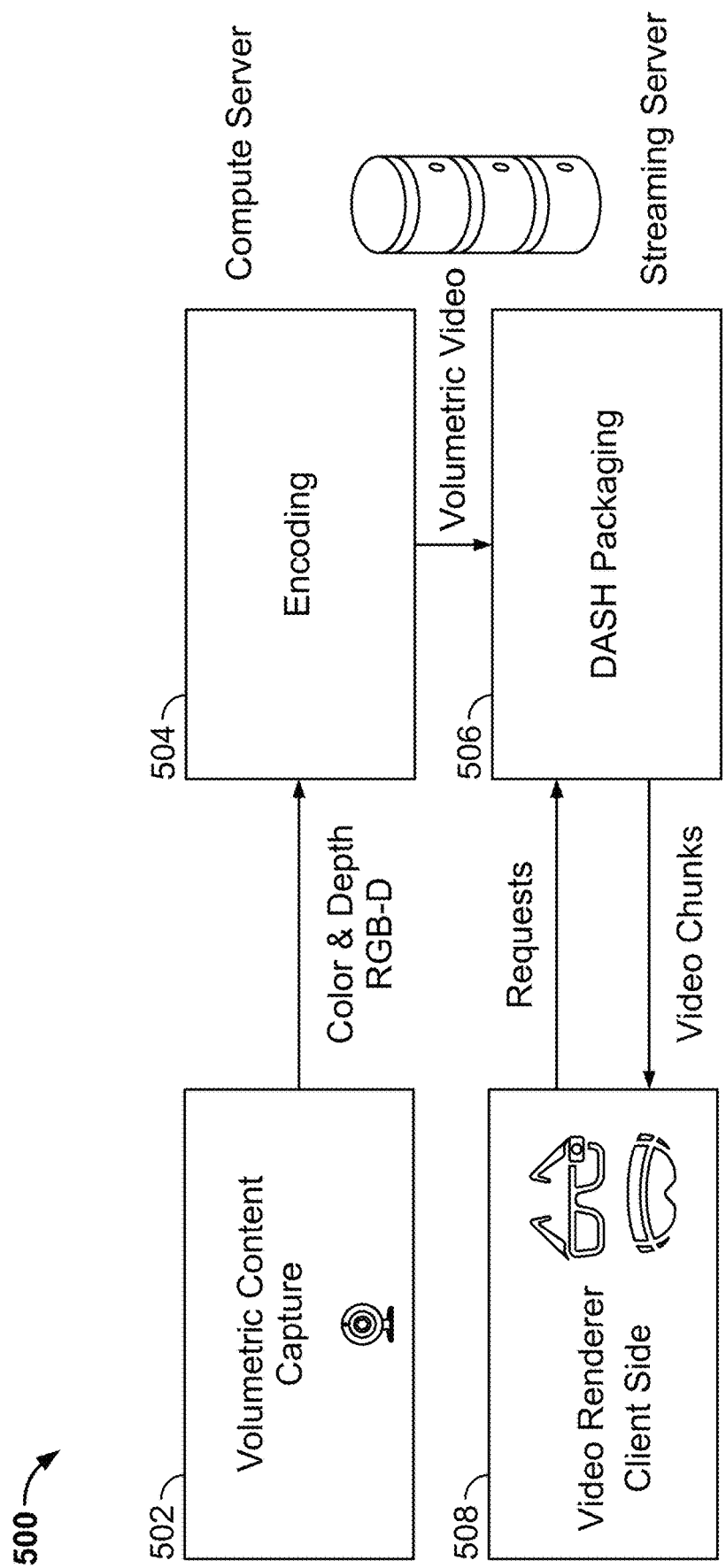
FIG. 5 shows an illustrative block diagram for media asset control when streaming a 3D media asset, in accordance with some embodiments of this disclosure.

FIG. 5 shows an illustrative block diagram 500 for media asset control when streaming a 3D media asset, in accordance with some embodiments of this disclosure. At 502, a 3D media asset, e.g., a volumetric 3D media asset 300, may be generated in the manner as discussed above. In some embodiments, such 3D media asset may be contained within a uniform total volumetric video stream, inserted into a 2D stream as an optional volumetric asset add-on, recalled on demand by the player, initiated by the consumer, and/or inserted into a 3D video stream at certain timestamps as a volumetric video asset. At 504, any suitable encoding tool may be employed to encode and/or compress 3D media asset 300. For example, any suitable technique for encoding and/or compressing volumetric content may be employed, e.g., MPEG video point cloud compression (VPCC) or 8i or any other suitable technique, which may capture color and depth information (RGB-D) of 3D media asset 300. At 506, dynamic adaptive streaming over HTTP protocols (DASH), and/or any other suitable protocol, may be employed for volumetric video (and/or audio) streaming to transmit such 3D media asset 300 to a receiving device, e.g., comprising video render functionality 508.

Figure 6:
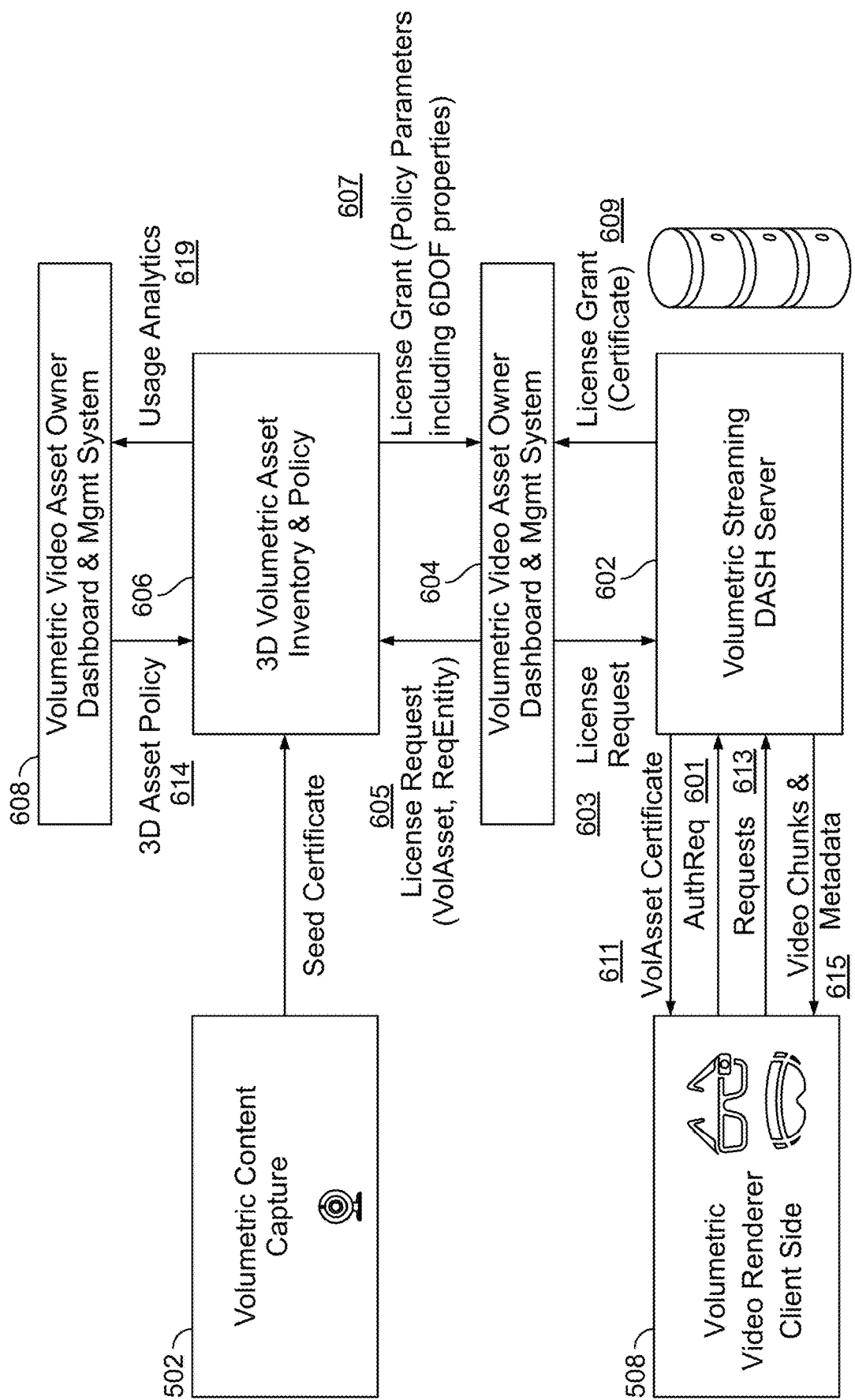
FIG. 6 shows an illustrative block diagram for media asset control when streaming a 3D media asset, in accordance with some embodiments of this disclosure.

FIG. 6 shows an illustrative block diagram 600 for media asset control when streaming a 3D media asset, in accordance with some embodiments of this disclosure. Volumetric streaming DASH server 602 may determine that the video player at client-side renderer 508 has advanced to a timestamp at which a 3D media asset (e.g., 3D media asset 300 of FIG. 3) is present, or has otherwise requested to access at least a portion of a 3D media asset. At 601, based on the seed certificate, e.g., embedded in 3D media asset 300, the media control application may cause an authorization request to be issued to server 602. In some embodiments, at this point, the video renderer 508 at the client side may only be permitted to render the modified or baseline content having been subject to the aforementioned cloaking technique(s). At 603, server 602 may request a license from volumetric content license and certificate server 604. For example, the original version of the 3D media asset may be selectively licensed, and any suitable mechanism for detecting theft and/or purchase or use control may be employed in connection with the original version of the 3D media asset and/or the modified version of the 3D media asset. At 605, after receiving the license request at 603, server 604 may query 3D volumetric asset inventory and policy database 606 for a 3D media asset policy associated with the seed certificate of 3D media asset 300, or a portion thereof, having been requested. Such query may include any suitable number or types of parameters, such as, for example, an identification of the requested 3D media asset 300 or portion(s) thereof; an indication of whether or not 3D media asset 300 is a livestreaming session or interactive session; an identification of the requesting entity (e.g., streaming server, player type, playing device type, and/or playing device capabilities, and/or any other suitable parameters); a nature of the content (e.g., an indication of metadata, and/or URLs associated with the content, and/or any other suitable parameters); and/or a number of render requests (to minimize back and forth signaling) and/or any other suitable parameter(s).

At 607, database 606 may respond to the query received at 605 based on the 3D media asset policy (transmitted at 614) associated with the seed certificate and having been previously specified by the 3D media asset owner. The policy may enable the 3D media asset owner to control how the 3D media asset is used, e.g., based on an identity of the user requesting access and/or characteristics of such requesting user's device hardware and/or software and/or network connection. At 609, server 604 may respond to the request received at 603 by transmitting a certificate granting a license with certain parameters (e.g., including 6-DOF movement details of one or more entities of the 3D media asset) to server 602. For example, the media control application may determine, based on the policy, to enable access to at least a portion of the 3D media asset. At 611, such certificate may be transmitted to client-side renderer 508, which may request (at 613) video and/or audio chunks, e.g., containing the requested or next portions of the 3D media asset. In some embodiments, at 611, the metadata container, or portions thereof, comprising indications of the original attributes prior to modification of such attributes in the modified 3D media asset, may be transmitted to client-side renderer 508.

At 615, server 602 may stream to client-side renderer 508 the requested video chunks, e.g., via the DASH protocol, which may comprise the metadata container, which may be encrypted, or the metadata container may be transmitted out of band after the license grant. In some embodiments, to minimize the use of computational resources, the modified version of the media asset may not be encrypted, while the metadata can be encrypted. At the client side, a checksum operation, as discussed above, may be performed to verify the metadata as authentic and/or corresponding to the baseline or modified version of the media asset. The client-side renderer 508 may decrypt the metadata, and reconstruct the original 3D media asset or original portion(s) thereof using the decrypted metadata and render the 3D media asset as it was captured in its originally intended, authorized fashion, e.g., based on passing the checksum operation. The techniques described above and below may enable reconstruction to be performed during runtime of the 3D media asset in a lightweight manner, e.g., without lagging noticeable to the end user. In some embodiments, for complex assets or heavily cloaked 3D volumetric assets (for instance with convoluted 6-DOF manipulations), a short jitter buffer may be inserted at the client side to help ensure the process appears seamless to the end user. In some embodiments, client side renderer 508 may transmit (at 619) back usage statistics or analytics to the volumetric video asset owner dashboard and management system server 608. While some of the components of FIG. 6 have been described as different servers and/or databases, in some embodiments, such components can be implemented as part of a single server and/or database.

As part of the DASH protocol, a manifest may be employed, e.g., stored at server 602 and/or any other suitable component of FIG. 6. As referred to herein, the term "manifest" should be understood to refer to a file and/or a data structure containing information about sequential segments (comprising sequential frames) of a media asset that is available to a client device. Such information may include, e.g., a number of segments in a playlist, bit rates of each segment, codecs associated with each segment, resolution of each segment, timing of each segment, location on the network (e.g., network 806 of FIG. 8) where a segment may be retrieved, bandwidth of each segment, video tracks of each segment, audio tracks of each segment, subtitle tracks of each segment, captions of each segment, languages of each segment, other metadata associated with each segment, and/or any other suitable information. The manifest may be employed in any of a variety of streaming protocols, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), and/or manifest files for Microsoft Smooth Streaming (MSS), etc. The manifest may be a standard manifest (e.g., an MPD file from MPEG-DASH) or may be a modified version of a standard manifest. A segment may comprise information (e.g., encoded video, audio, subtitle information, error correction bits, error detection bits, etc.) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., from one second to a few seconds). In some embodiments, the manifest may be an XML file.

In some embodiments, the media control application may be configured to supplement the manifest to facilitate receipt of authentic portions of the modified 3D media asset 300, e.g., having been cloaked to modify and/or omit certain identified and/or selected attribute(s). For example, the AuthReq message transmitted at 601 by client side renderer 508, e.g., via DASH signaling, may include one or more of the parameters discussed in connection with the query parameters of step 605. After authentication and the license grant of step 607, an authentic content template may be transmitted from server 604 and/or server 602, having access to the authentic content, such as for example, using the following structure for transmission to client side renderer 508:

```
<VolumetricAssetTemplate
   <RepresentationofVolAsset volAssetCertificate= metadata.certificate volMetadata =
encryptedmetadata.file volMetadataPolicy= policy.dat
   />RepresentationofVolAsset>
</VolumetricAssetTemplate>
```

In some embodiments, the encrypted metadata file may be sent, e.g., out of band (OOB), in response to performing the license grant at 607. Such metadata file may comprise adequate information (e.g., about where and what the cloaked part(s) of the asset are within the asset) to enable client-side renderer 508 to reconstruct original 3D media asset 300 and play such original 3D media asset in place of the modified version of the 3D media asset 300. In some embodiments, the specific pattern or signature used to perform the modification or cloaking of 3D media asset 300 may be leveraged to perform such reconstruction operation. While the example of FIG. 6 references a video segment of 3D media asset 300, it should be appreciated that such segment may additionally include an audio portion of 3D media asset, or may alternatively correspond to only an audio portion or only a visual portion of 3D media asset 300. For example, a subtle audio feature may be modified or cloaked from the original version of the 3D media asset in generating the modified version of the 3D media asset. In some embodiments, such audio portion may correspond to the audio adaptation set of the DASH MPD file. Such reconstruction of the media asset as originally captured may be performed in real time and may comprise, e.g., flipping bits or restoring color or other attributes in a particular area (e.g., restoring texture of an entity's face in the 3D media asset). In some embodiments, the media control application may prevent or cease rendering of the 3D media asset if a response to the seed certificate is not received.

In some embodiments, VolmetricAssetTemplate can apply to certain time durations within the 3D media asset session and may not have to be signaled, e.g., if a template is indicated to be applicable for a given period of time. Such template may be inserted into the larger overall DASH file, such as, for example, after a segmentFile section:

In some embodiments, the media control application may utilize the seed certificate, e.g., once the client-side renderer 508 attempts to render the asset, to check if a network connection exists, and upon determining such network connection exists, attempt to contact the server 604 and start the authorization process detailed herein. In some embodiments, if no network connection is detected, or server 604 is otherwise not reachable, client side renderer 508 may render the modified template cloaked version of 3D media asset 300. As discussed in more detail below, performance of this rendering operation may vary over time. In some embodiments, if the network is unreachable only temporarily (e.g., for a period of time below a threshold), and if 3D media asset authorization is eventually achieved, client side renderer 508 may report back the usage stats (by way of step 619) back to the 3D media asset owner (e.g., via 608) during this "unconnected" timeframe. For example, the 3D media asset owner may use this usage data for content royalty reporting and/or any other suitable purpose.

In some embodiments, the media control application may be configured to provide the asset owner with control of 3D media assets by enabling the asset owner or any other suitable user to set one or more 3D media asset policies. The media control application may be configured to provide an interface by which a user can set, or can be configured to automatically set, a default policy, and can enable a user to dynamically change, or can be configured to automatically change, one or more of the 3D media asset policies. As shown in Table 1 below, an illustrative policy may comprise dimensions per 3D media asset; per requesting streaming server; per requesting device OEM/type; per requesting device capabilities and/or any other suitable dimension(s):

TABLE 1

Volumetric Video Asset Policy Candidates

| | | | |
|---|---|---|---|
| Michael Jackson | FortNite | LenovoPC | AMD |
| Tom Brady | FuboTV | Oculus Quest 2 | Tesla GPU |

```
<!-- 1080p Representation at 6.8 Mbps -->
   <Representation id="1080p" bandwidth="6800000" width="1920"
         height="1080">
      <BaseURL>1080/</BaseURL>
      <!-- Since all of our segments have similar names, this time
         we'll use a SegmentTemplate -->
      <SegmentTemplate media="segment-$Number$.ts" timescale="90000">
<RepresentationIndex sourceURL="representation-index.sidx"/>
         <!-- Let's add a SegmentTimeline so the client can easily see
            how many segments there are -->
         <SegmentTimeline>
            <!-- r is the number of repeats _after_ the first one, so
               this reads:
               Starting from time 0, there are 10 (9 + 1) segments
               with a duration of (5400000 / @timescale) seconds. -->
            <S t="0" r="9" d="5400000"/>
            </SegmentTimeline>
         </SegmentTemplate>
      </Representation
```

TABLE 1-continued

Volumetric Video Asset Policy Candidates

| | | | |
|---|---|---|---|
| Mickey Mouse & Minnie | Disney+ | Apple iGlass | 12 Bionic |
| Kim Kardashian | E Entertainment | SmartPhone | SnapDragon 856 |

In some embodiments, a 3D media asset policy may comprise, and allow selection and modification of, any suitable parameters, such as, for example, permitted consumption of the 3D media asset; permitted transmission of the 3D media asset for a particular server; permitted consumption of the 3D media asset for a requesting device type (e.g., adjusting the rendering accordingly); permitted consumption of the 3D media asset for particular capabilities of a requesting device; time duration limitations associated with the 3D media asset (e.g., expiring at a certain date); number of render limitations associated with the 3D media asset (e.g., only allow a particular number of free plays of the 3D media asset); or 6-DOF movement capability (e.g., orientation of the 3D media asset and/or adjacency of the 3D media asset with respect to other 3D media assets) limitations with respect to the 3D media asset. For instance, the policy may specify to maintain 2D movement capability but remove 3D 6-DOF movement capability, e.g., by removing movement prediction frames and/or relevant coarse geometry from VPCC as indicated by point-to-point and point-to-plane. As non-limiting examples, the policy may indicate that a non-fungible token associated with the 3D media asset can be played only once, or the 3D media asset can be played 50 times per month, or millions of times per month, under control of the media control application. An illustrative policy is shown in Table 2 below:

TABLE 2

Volumetric Video Asset 6-DOF Policy

| VolAsset ID | Left | Right | Back | Fwd | Up | Down |
|---|---|---|---|---|---|---|
| Michael Jackson | Y | Y | N | N | Y | Y |

In some embodiments, the media control application may permit 3D media asset owners to specify that certain portions of a 3D media asset should be excluded, e.g., for confidentiality reasons, from all or a subset of consuming users. As an example, for a 3D capture and generation of a new model of an automobile, the media control application may enable the automobile manufacturer to specify that a particular portion (e.g., the taillight section) should be omitted or occluded from the media asset, e.g., before the model is publicly announced. That is, the media control application may enable the 3D media asset owner to access the point cloud or mesh data stream and zero out sections of such data corresponding to the particular portion to be excluded. As another example, the media control application may enable the 3D media asset owner to specify that certain portions of an entity in a 3D media asset should be excluded for certain user due to parental control reasons, e.g., a bare back of a human captured for a medical documentary asset, and/or any other suitable reason in any suitable type of scenario.

In some embodiments, a default policy may state that if after a certain period of time (e.g., 5 minutes or any other suitable time) or number of renders (e.g., 2 or any other suitable number) authentication of the certificate is not achieved (e.g., due to the hardcoded certificate policy), cloaked assets or sub-assets may start a gradual degradation cycle. Such gradual degradation cycle may correspond to color loss, frame loss, dropped frames, only showing a base 2D version of the asset, and/or any other suitable degradation technique, at the player level that such unauthorized assets eventually may not be rendered anymore by the player at client-side renderer 508. Similarly, baseline spatial audio may play in alternate or reverse fashion, and/or audio may be subjected to any other suitable degradation technique, which may cause an unpleasant experience for an unauthorized user. If a network connection exists, and authentication fails, the offending entity trying to play the 3D media asset may be revealed to the 3D asset owner via communications over the network, even though the offending entity may be unaware that he or she has been detected and traced, due to the cloaked nature of the 3D asset.

In some embodiments, the media control application may enable the 3D media asset owner to set other policies that can limit how the 3D media asset (or parts thereof) should appear and/or whether such asset or portions thereof can be inserted within the scope of a longer media session, regardless of whether the session is a full 3D session or a combined 2D and 3D session. For example, an owner of a volumetric 3D media asset having a digital representation of the New York Yankees professional baseball team may specify, and the media control application may enforce, a policy that such 3D media asset or portions thereof should not be placed in a media session associated with the Boston Red Sox professional baseball team. As another example, an owner of a volumetric 3D media asset having a digital representation of Coca-Cola brand may specify, and the media control application may enforce, a policy that such 3D media asset or portions thereof should not be placed in a media session associated with Pepsi brand. For example, server 608, or any other suitable application, component or system described herein, may be configured to analyze metadata and URL(s), or otherwise determine the subject thereof, received in association with content. If the content session is determined by the media control application to be a 3D session, such analysis may include ascertaining other 3D entities and their orientation with respect to the owner's specific volumetric media asset. In some embodiments, such analysis may be conducted by the media control application requesting a compressed version of other 3D media assets. Alternatively, if a final rendering has already been configured on streaming server 602 and/or on client side 508, the asset owner and/or media control application may request that a playout version of their owned 3D media asset be finally rendered. This may allow the asset owner and/or media control application to grant a license if such a rendering session is approved of. As another example, the asset owner may decide to prevent 6-DOF navigation of certain rooms or sections of the White House or another confidential building or site, and may prohibit certain entities (e.g., flags of other nations) to be inserted during the rendering session. As another example, the media application may determine that a requesting device's capabilities or current state are insufficient to play the 3D media asset in a quality that is specified in the policy of the 3D media asset, and thus may prevent or limit access of such 3D media asset and/or modified version thereof, to such requesting device. In some embodiments, based on the policy, if the requesting device's capabilities or current state (e.g., not on 5G) does not meet policy requirements, the requesting device may be asked to submit payment or be denied access to the original version and/or modified version of the asset.

In some embodiments, the media control application may enable the 3D media asset owner to adjust a policy based on whether a 3D media asset streaming session is a live or interactive session. For example, the media control application may obtain information indicating client-side device capabilities (e.g., memory and computation limitations), and such information, coupled with the information indicating the nature of the media session, may inform a decision on whether to grant different license options, e.g., automatically or manually. For instance, for a live streaming NFL game, it may be desirable to provide a lightest-weight template (in terms of computational resource requirements to transmit and/or render), given that a very large number of rendering devices may simultaneously request to access such a live asset. At the same time, it may be desirable for an asset to be rendered as many times as possible with optimal performance to enhance or maintain the reputation of the asset owner, for consumers viewing the session via volumetric video render players or other suitable 3D media asset players. Accordingly, the media control application may provide 3D media asset owners with several license grant templates generated at the capture time that may be authorized based on the session type and number of session players, from the scalability perspective. Such a mix- and match-approach of varying degrees of authentication templates that can be signaled to the server 602 may be employed for a media session and can be taken advantage of during different volumetric video streaming sessions and even at different offsets of the streaming session.

In some embodiments, the media control application may enable the 3D media asset owner to build a hierarchical and tightly controlled relationship between different 3D media assets. For example, the media control application may specify that a license for a Calculus BC 3D model can only be granted after client-side renderer 508 confirms that the 3D Models for Precalculus 3D models have been completed. As another example, during a fitness 3D media asset session, the media control application may only enable access to advanced fitness 3D media assets if client side renderer 508 confirms the 6-DOF performance of the user (e.g., reported via usage analytics at 619) is acceptable for the beginner fitness 3D media asset.

The media control application may enable the 3D media asset owner to specify that during certain types of media sessions (e.g., a simultaneous interactive session), a particular streaming server should be configured to provide the authentic 3D media asset template, and other streaming servers may be configured to provide the baseline or modified 3D media asset template. As an example, an authentic volumetric 3D media asset featuring a digital representation of a celebrity may be appearing as part of a metaverse environment (e.g., Facebook's metaverse), whereas a version of such asset with less liveliness may appear as part of a metaverse environment on another platform (e.g., Apple's metaverse). As another example, the media control application may provide a media asset owner with discretion with respect to provisioning a particular volumetric asset streaming server to use complex metadata capable of providing a richer experience whereas other servers may be provisioned to handle less complex metadata. Such other servers may provide what appears to the user as an authentic media asset consumption experience, e.g., the baseline or modified version of the 3D media asset. Given that the 3D media asset owner is receiving usage statistics, such features can be extended further to include quality of experience (QoE) stats specific to the 3D media asset owner. For example, if client-side renderer 508 and/or server 608 observes that QoE (e.g., based on collected eye tracking, HRTF or biometric data and computed on the client side) is low during a rendering stage and reports such information, the asset owner may switch to using a less complex metadata template. For example, the media control application may automatically, or based on asset owner selection, switch from a more complex metadata template to a less complex template, as signaled in an updated policy for a new 3D media asset license.

In some embodiments, the media control application may enable the 3D media asset owner to set a policy for the metadata of the 3D media asset. For example, even if the metadata is transmitted to client-side renderer 508, the metadata may be encrypted and/or locked, such that the metadata can only be unlocked using, e.g., specific data from the hardware, such as, for example, a trusted execution environment (TEE) such as, for example, ARM TrustZone. This may act as a second factor authorization of the volumetric asset, thereby providing more flexibility to the 3D media asset owner. Additionally or alternatively, a particular network type (e.g., the connection type such as cellular, Wi-Fi, etc.) or edge/cloud location or IP Geofencing may be leveraged as a second factor for the reconstruction on the client-side renderer 508 side, thereby providing more assurances for the 3D media asset owner in terms of preventing leakage.

In some embodiments, the processes and techniques described above and below may be offered via an application programming interface (API) to developers. For example, software tools (e.g., one or more software development kits, or SDKs) may be provided to any suitable party, to enable the party to implement the functionality of the media control application described above and below.

Figure 7:
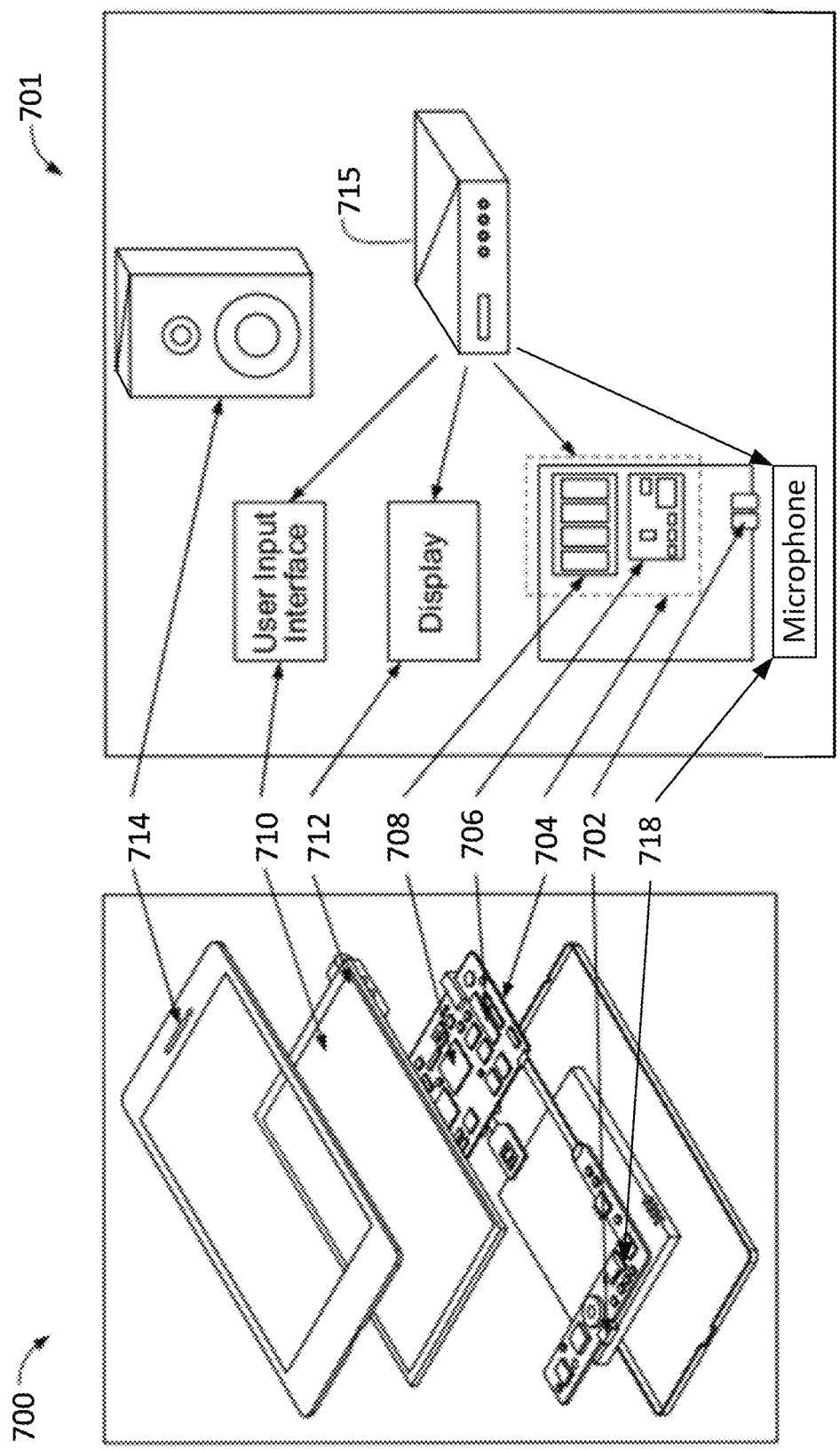
FIGS. 7-8 show illustrative devices and systems for media asset control of a 3D media asset, in accordance with some embodiments of this disclosure.
Figure 8:
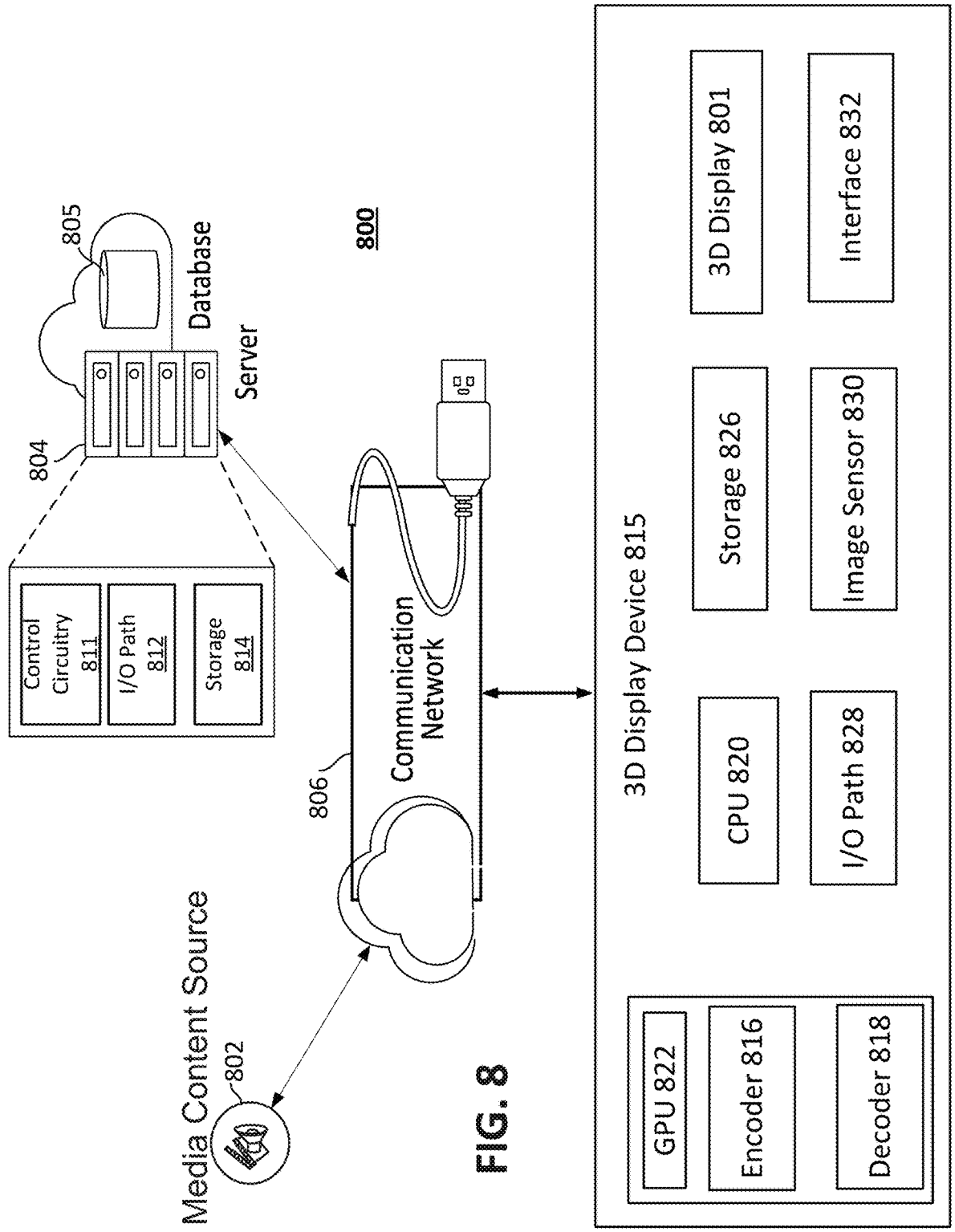

FIGS. 7-8 describe illustrative devices, systems, servers, and related hardware for media asset control of a 3D media asset, in accordance with some embodiments of this disclosure. FIG. 7 shows generalized embodiments of illustrative user equipment devices 700 and 701, which may correspond to and/or include, e.g., a 3D display as described herein, or any other suitable device, or any combination thereof. For example, user equipment device 700 may be a smartphone device, a tablet, smart glasses, a virtual reality or augmented reality device, or any other suitable device capable of generating for display, and/or displaying, and/or enabling a user to consume, media assets, and capable of transmitting and receiving data, e.g., over a communication network. In another example, user equipment device 701 may be a user television equipment system or device. User television equipment device 701 may include set-top box 715. Set-top box 715 may be communicatively connected to microphone 716, audio output equipment (e.g., speaker or headphones 714), and display 712. Display 712 may correspond to 3D display of FIG. 1. In some embodiments, microphone 716 may be configured to receive audio corresponding to a voice of a user, e.g., a voice command. In some embodiments, display 712 may be a television display or a computer display.

In some embodiments, set-top box 715 may be communicatively connected to user input interface 710. In some embodiments, user input interface 710 may be a remote control device. Set-top box 715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 8. In some embodiments, device 700 and/or device 701 may comprise any suitable number of sensors, as well as a GPS module (e.g., in communication with one or more servers and/or cell towers and/or satellites) to ascertain a location of device 700.

Each one of user equipment device 700 and user equipment device 701 may receive content and data via input/output (I/O) path 702. I/O path 702 may provide content (e.g., 3D media assets, holographic content, volumetric content, light field content, broadcast programming, on-demand programming, Internet content, content available over a local area network (LAN) or wide area network (WAN), 3D content, or any combination thereof, and/or other content) and data to control circuitry 704, which may comprise processing circuitry 706 and storage 708. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing. While set-top box 715 is shown in FIG. 7 for illustration, any suitable computing device having processing circuitry, control circuitry, and storage may be used in accordance with the present disclosure. For example, set-top box 715 may be replaced by, or complemented by, a personal computer (e.g., a notebook, a laptop, a desktop), a smartphone (e.g., user equipment device 700), a tablet, a network-based server hosting a user-accessible client device, a non-user-owned device, any other suitable device, or any combination thereof.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for the media control application stored in memory (e.g., storage 708). Specifically, control circuitry 704 may be instructed by the media control application to perform the functions discussed above and below. In some implementations, processing or actions performed by control circuitry 704 may be based on instructions received from the media control application.

In client/server-based embodiments, control circuitry 704 may include communications circuitry suitable for communicating with a server or other networks or servers. The media control application may be a stand-alone application implemented on a device or a server. The media control application may be implemented as software or a set of executable instructions. The instructions for performing any of the embodiments discussed herein of the media control application may be encoded on non-transitory computer-readable media (e.g., a hard drive, random-access memory on a DRAM integrated circuit, read-only memory on a BLU-RAY disk, etc.). For example, in FIG. 7, the instructions may be stored in storage 708, and executed by control circuitry 704 of user equipment 700.

In some embodiments, the media control application may be or comprise a client/server application where only the client application resides on user equipment device 700, and a server application resides on an external server (e.g., one or more servers 804 of FIG. 8). For example, the media control application may be implemented partially as a client application on control circuitry 704 of user equipment device 700 and partially on server 804 as a server application running on control circuitry 711. Server 804 may be a part of a local area network with one or more of user equipment devices 700, 701 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 804), referred to as "the cloud." User equipment device 700 may be a cloud client that relies on the cloud computing capabilities from server 804 to implement request for, and reconstruction of, an original version of a 3D media asset. When executed by control circuitry 704 or 811, the media control application may instruct control circuitry 704 or 811 circuitry to perform processing tasks for the client device and facilitate a media consumption session integrated with social network services. The client application may instruct control circuitry 704 to execute one or more of the systems and methods disclosed herein.

Control circuitry 704 may include communications circuitry suitable for communicating with a server, social network service, a table or database server, or other networks or servers The instructions for carrying out the above mentioned functionality may be stored on a server (which is described in more detail in connection with FIG. 8). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as 3D media assets and/or metadata and/or manifest files and/or any other suitable data, as described above. Nonvolatile memory may also be used (e.g., to launch a boot-up routine and other instructions). Cloud-based storage may be used to supplement storage 708 or instead of storage 708.

Control circuitry 704 may include video generating circuitry and tuning circuitry, such as one or more analog tuners, one or more VPCC decoders or any other suitable digital decoding circuitry, high-definition tuners, or any other suitable tuning or video circuits or combinations of such circuits. Encoding circuitry (e.g., for converting over-the-air, analog, or digital signals to H. VPCC signals for storage) may also be provided. Control circuitry 704 may also include scaler circuitry for upconverting and downconverting content into the preferred output format of user equipment 700. Control circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

Control circuitry 704 may receive instruction(s) from a user by way of user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of each one of user equipment device 700 and user equipment device 701. For example, display 712 may be a touchscreen or touch-sensitive display. In such circumstances, user input interface 710 may be integrated with or combined with display 712. In some embodiments, user input interface 710 includes a remote-control device having one or more microphones, buttons, keypads, any other components configured to receive user input or combinations thereof. For example, user input interface 710 may include a handheld remote-control device having an alphanumeric keypad and option buttons. In a further example, user input interface 710 may include a handheld remote-control device having a microphone and control circuitry configured to receive and identify voice commands and transmit information to set-top box 715.

Audio output equipment 714 may be integrated with or combined with display 712. In some embodiments, display 712 may be any suitable display capable of being implemented as a 3D display and/or as part of a 3D display device (e.g., 3D display device 815 of FIG. 8). In some embodiments, display 712 may comprise one or more of a monitor, a television, a liquid crystal display (LCD) for a mobile device, amorphous silicon display, low-temperature polysilicon display, electronic ink display, electrophoretic display, active matrix display, electro-wetting display, electrofluidic display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Audio output equipment 714 may be provided as integrated with other elements of each one of user equipment device 700 and user equipment device 701 or may be stand-alone units. An audio component of videos and other content displayed on display 712 may be played through speakers (or headphones) of audio output equipment 714. In some embodiments, audio may be distributed to a receiver (not shown), which processes and outputs the audio via speakers of audio output equipment 714. In some embodiments, for example, control circuitry 704 is configured to provide audio cues to a user, or other audio feedback to a user, using speakers of audio output equipment 714. There may be a separate microphone 716 or audio output equipment 714 may include a microphone configured to receive audio input such as voice commands or speech. For example, a user may speak letters or words that are received by the microphone and converted to text by control circuitry 704. In a further example, a user may voice commands that are received by a microphone and recognized by control circuitry 704. Camera 718 may be any suitable video camera integrated with the equipment or externally connected. Camera 718 may be a digital camera comprising a charge-coupled device (CCD) and/or a complementary metal-oxide semiconductor (CMOS) image sensor. Camera 718 may be an analog camera that converts to digital images via a video card.

The media control application may be implemented using any suitable architecture. For example, it may be a stand-alone application wholly-implemented on each one of user equipment device 700 and user equipment device 701. In such an approach, instructions of the media control application may be stored locally (e.g., in storage 708), and data for use by the application may be downloaded on a periodic basis (e.g., from an out-of-band feed, from an Internet resource, or using another suitable approach). Control circuitry 704 may retrieve instructions of the media control application from storage 708 and process the instructions to execute machine learning model 201 and/or perform the encoding processes and/or any other techniques discussed herein, and/or provide media consumption and/or social network interaction functionality and generate any of the displays discussed herein. Based on the processed instructions, control circuitry 704 may determine what action to perform when input is received from user input interface 710. For example, movement of a cursor on a display up/down may be indicated by the processed instructions when user input interface 710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 704 may allow a user to provide user profile information or may automatically compile user profile information. For example, control circuitry 704 may access and monitor network data, video data, audio data, processing data, participation data from a social network profile, or any other suitable data, or any combination thereof. Control circuitry 704 may obtain all or part of other user profiles that are related to a particular user (e.g., via social media networks), and/or obtain information about the user from other sources that control circuitry 704 may access. As a result, a user can be provided with a unified experience across the user's different devices.

In some embodiments, the media control application may be a client/server-based application. Data for use by a thick or thin client implemented on each one of user equipment device 700 and user equipment device 701 may be retrieved on-demand by issuing requests to a server remote to each one of user equipment device 700 and user equipment device 701. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on user equipment device 700. This way, the processing of the instructions is performed remotely by the server while the resulting displays (e.g., that may include text, a keyboard, or other visuals) may be provided locally on user equipment device 700. User equipment device 700 may receive inputs from the user via input interface 710 and transmit those inputs to the remote server for processing and generating the corresponding displays. For example, user equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display may then be transmitted to user equipment device 700 for presentation to the user.

In some embodiments, the media control application may be downloaded and interpreted or otherwise run by an interpreter or virtual machine (run by control circuitry 704). In some embodiments, the media control application may be encoded in the ETV Binary Interchange Format (EBIF), received by control circuitry 704 as part of a suitable feed, and interpreted by a user agent running on control circuitry 704. For example, the media control application may be an EBIF application. In some embodiments, the media control application may be defined by a series of JAVA-based files that are received and run by a local virtual machine or other suitable middleware executed by control circuitry 704. In some embodiments, the media control application may be, for example, encoded and transmitted in a VPCC or VVC or H.265 object carousel with the VPCC or VVC or H.265 audio and video packets of a program.

FIG. 8 is a diagram of an illustrative system 800, in accordance with some embodiments of this disclosure. System 800 may comprise one or more of media content source 802, one or more of server 804, one or more of database 805 and one or more of 3D display device 815 (e.g., comprising or otherwise coupled to 3D display 801, or any other suitable device, or any combination thereof), and/or any other suitable components. each of which may be coupled to communication network 806. In some embodiments, 3D display device 815 may correspond to user equipment device 700 or user equipment device 701. Communication network 806 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

System 800 may comprise any suitable number of user equipment devices, and such devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 806. In some embodiments, the media control application may be executed at one or more of control circuitry 811 of server 804 (and/or control circuitry of 3D display device 815 and/or at media content source 802). In some embodiments, any suitable data, e.g., authentic 3D media assets, modified or cloaked 3D media assets, policies for 3D media assets, metadata for 3D media assets, may be stored at database 805 maintained at or otherwise associated with server 804, and/or at storage at 3D display device 815. In some embodiments, server 804 may comprise a single server or multiple servers, and may correspond to or otherwise be in communication with one or more of servers and/or databases 602, 604, 606, 608, and/or 617 of FIG. 6.

In some embodiments, server 804 may include control circuitry 811 and storage 814 (e.g., RAM, ROM, hard disk, Removable Disk, etc.). Storage 814 may store one or more databases. Server 804 may also include an input/output (I/O) 812. I/O path 812 may provide media consumption data, social networking data, device information, or other data, over a local area network (LAN) or wide area network (WAN), and/or other content and data to control circuitry 811, which may include processing circuitry, and storage 814. Control circuitry 811 may be used to send and receive commands, requests, and other suitable data using I/O path 812, which may comprise I/O circuitry. I/O path 812 may connect control circuitry 811 (and specifically processing circuitry) to one or more communications paths.

Control circuitry 811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 811 executes instructions for the media control application stored in memory (e.g., the storage 814). Memory may be an electronic storage device provided as storage 814 that is part of control circuitry 811.

Display device 815 may comprise one or more of each of GPU 822, encoder 816, decoder 818, CPU 820, storage 826, 3D display 801, video interface 832, I/O path 828, and/or image sensor 830 and/or any other suitable component. GPU 822 may correspond to a computing processor specially designed to quickly process video signals, and may be implemented as part of a graphics card. In some embodiments, GPU 822 may comprise encoder 816 and/or decoder 818, or encoder 816 and/or decoder 818 may be otherwise separately implemented within or external to 3D display device 815. In some embodiments, server 804 and/or media content source 802 may comprise or be part of a content delivery network (e.g., comprising one or more data centers, and/or edge device), with any suitable number of GPUs, e.g., configured to perform at least a portion of encoding and/or decoding of data. For example, 3D display device 815 may receive encoded data locally or over a communication network. In some embodiments, display device 815 may comprise any suitable hardware and/or software configured to perform multiplexing and/or demultiplexing of data.

In some embodiments, 3D display 801 may comprise any suitable uniform or directional backlight system (e.g., a light-emitting diode lighting system and/or any other suitable backlighting) and/or any suitable rendering medium (e.g., liquid crystal layers, plasma layers, or any other suitable layers, or any combination thereof). In some embodiments, 3D display 801 may be capable of providing a 3D viewing experience to the user with or without the aid of an additional device, e.g., glasses equipped with temporal shutters, polarizers, color filters, or other optical or optoelectronic elements. In some embodiments, 3D display 801 may be configured to display holograms or holographic structures and/or any suitable volumetric content. In some embodiments, 3D display 801 may access the 3D media asset over any suitable data interface (e.g., HDMI, DisplayPort, or any other suitable interface, or any combination thereof) over which data may be received, e.g., from memory and/or over a network and/or any other suitable source. In some embodiments, voxels of the 3D media asset may be generated in physical space via light emission or light scattering, e.g., without a physical screen. In some embodiments, 3D display 801 may be configured to enable a user to modify the focus of different objects depicted in the media asset in a particular scene and/or while the media asset is progressing, e.g., in a foveated display, Decoder 818 may comprise any suitable combination of hardware and/or software configured to convert data in a coded form to a form that is usable as video signals and/or audio signals or any other suitable type of data signal, or any combination thereof. Encoder 816 may comprise any suitable combination of hardware and/or software configured to process data to reduce storage space required to store the data and/or bandwidth required to transmit data, while minimizing the impact of the encoding on the quality of the video or one or more images. Encoder 816 and/or decoder 818 may utilize any suitable algorithms and/or compression standards and/or codecs. In some embodiments, encoder 816 and/or decoder 818 may be a virtual machine that may reside on one or more physical servers that may or may not have specialized hardware, and/or a cloud service may determine how many of these virtual machines to use based on established thresholds. In some embodiments, separate audio and video encoders and/or decoders may be employed. In some embodiments, the functions of the decoder and encoder may be combined into a single entity, e.g., a programmed microcomputer which may perform a particular compression algorithm in both directions. In some embodiments, encoder 816 and/or decoder 818 may be part of, or external to, CPU 820. In some embodiments, encoder 816 and/or decoder 818 may comprise any suitable number of encoders, at a single location or distributed at any suitable number of locations.

CPU 820 may be implemented in a similar manner as control circuitry 804, and storage 826 may be implemented in a similar manner as storage 608. In some embodiments, interface 832 may be any suitable interface configured to transmit video and/or audio data to 3D display 801, and may utilize any suitable multiplexing or demultiplexing technique to combine or separate signals. In some embodiments, decoder 818 may be external to, or comprise part of, 3D display 801. I/O path 828 may be implemented in a similar manner as I/O path 502, and image sensor 830 may be implemented in a similar manner as camera 518. In some embodiments, image sensor 830 may comprise or be implemented as part of a 2D camera array or image sensor configured to capture information of a scene, and/or any other suitable sensor(s) may be employed (e.g., LiDAR, etc.). In some embodiments, 3D display device 515 may comprise or otherwise be coupled to a synthetic content generator, e.g., as rendered by a 3D model or game engine, to enable 3D display 801 to render content with a virtual camera in an array of positions to create the same sort of representation, e.g., to provide a video game experience and/or virtual reality and/or augmented reality experience for a user. 3D display 801 may optionally comprise or otherwise be coupled to a light engine, which may be an array of LEDs and a driver circuit used to illuminate 3D display 801, e.g., a volumetric display. Any suitable technique and/or components may be used to display imagery via 3D display 801, e.g., a backlight with multiple display layers, any suitable driver electronics or other displays, etc. The imagery may be, e.g., real world scenes captured by a camera, or computer generated views or any combination thereof.

Figure 9:
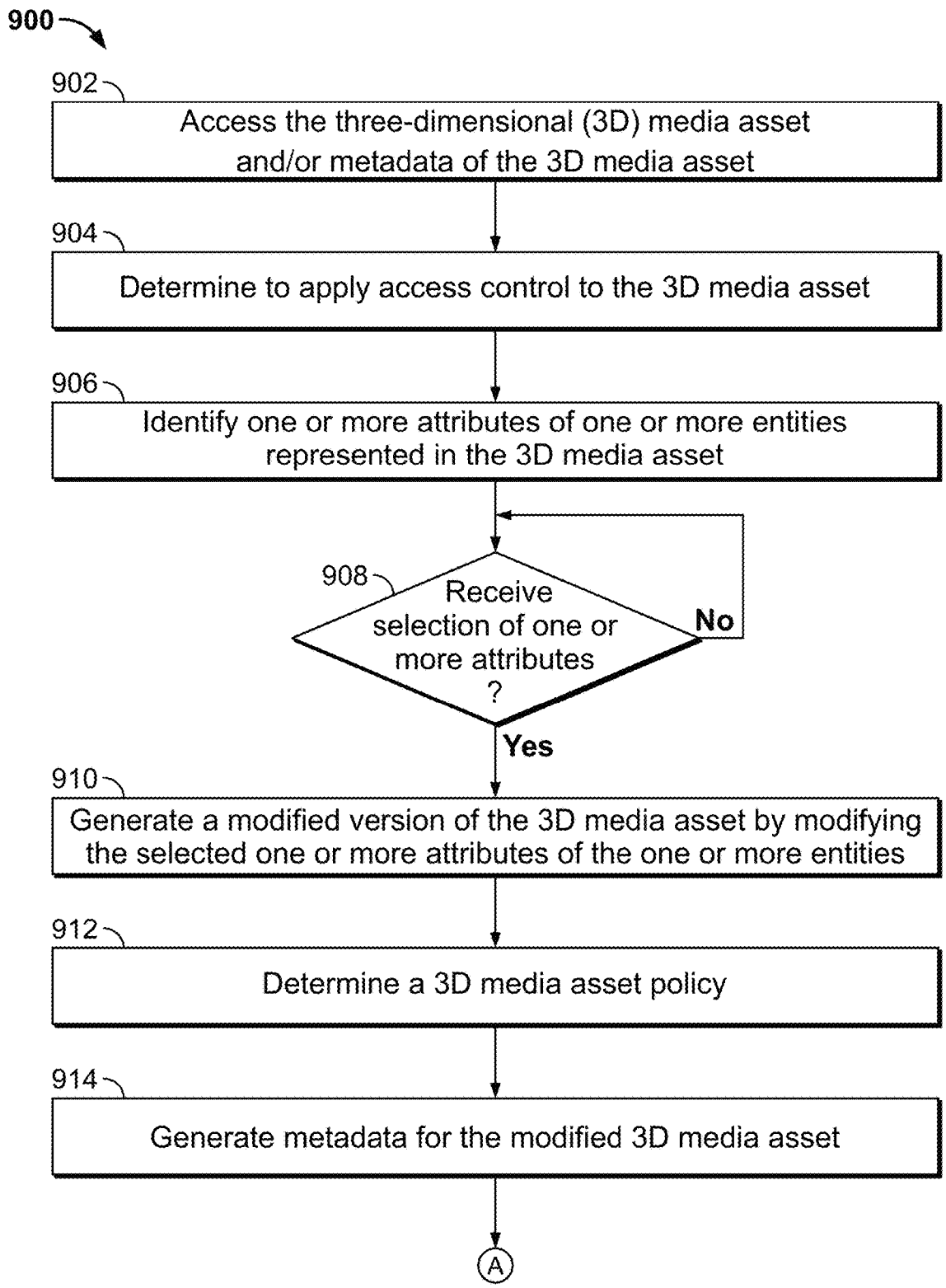
FIG. 9 is a flowchart of a detailed illustrative process for media asset control of a 3D media asset, in accordance with some embodiments of this disclosure.
Figure 9:
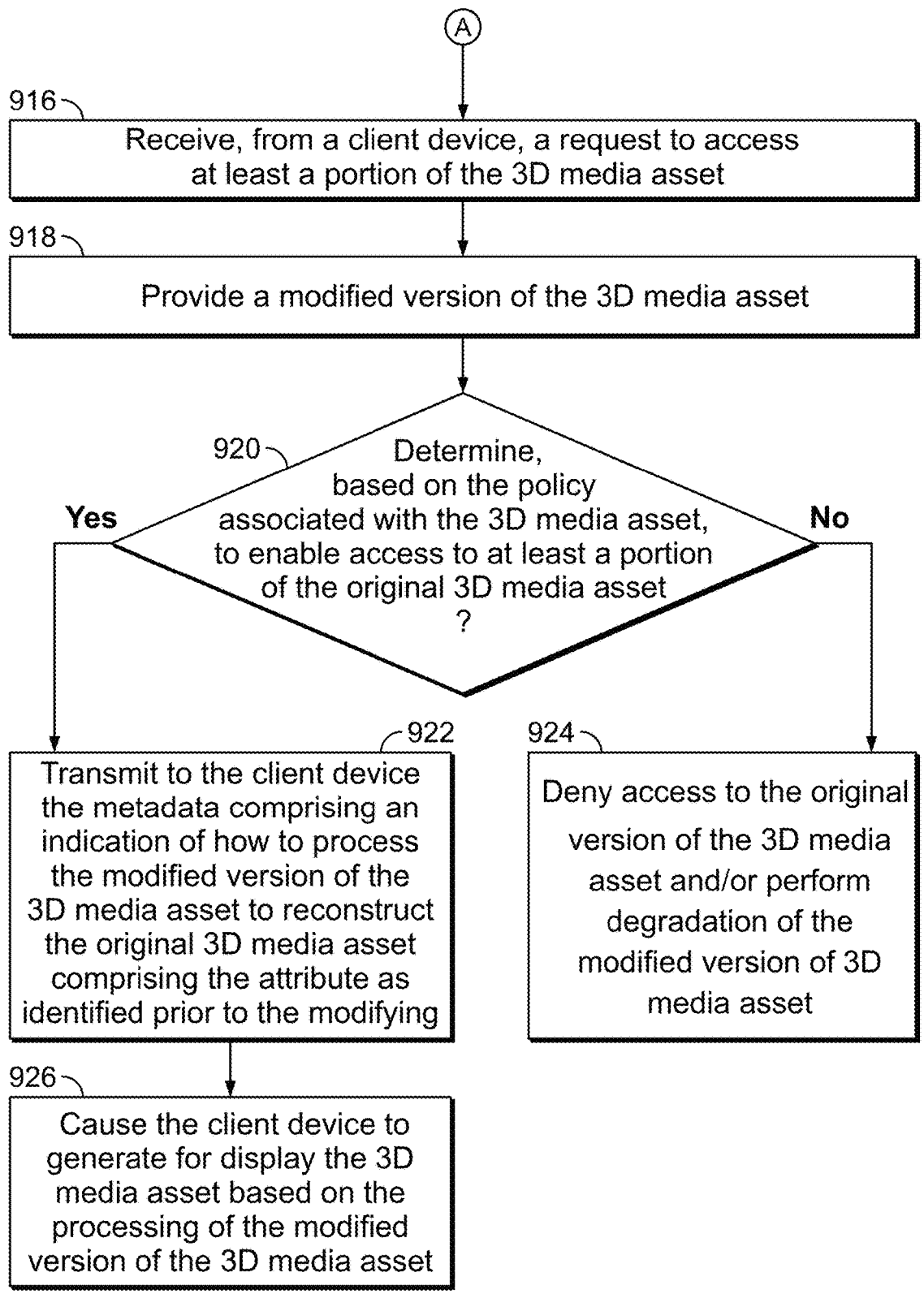

FIG. 9 is a flowchart of a detailed illustrative process 900 for media asset control of a 3D media asset, in accordance with some embodiments of this disclosure. In various embodiments, the individual steps of process 900 may be implemented by one or more components of the devices and systems of FIGS. 1-8. Although the present disclosure may describe certain steps of process 900 (and of other processes described herein) as being implemented by certain components of the devices and systems of FIGS. 1-8, this is for purposes of illustration only, and it should be understood that other components of the devices and systems of FIGS. 1-8 may implement those steps instead. In addition, one or more steps of process 900 may be incorporated into or combined with one or more steps of any other process or embodiment disclosed herein.

At 902, control circuitry (e.g., control circuitry 811 of server 804 of FIG. 8 and/or control circuitry of media content source 802 of FIG. 8 and/or CPU 820 of 3D display device 815 of FIG. 8) may be configured to access, e.g., from memory and/or over a network and/or any other suitable source, a 3D media asset (e.g., a volumetric media asset 300 of FIG. 3). Such 3D media asset may be generated by a user, e.g., via user equipment device 700, and/or in a studio (e.g., studio 200 of FIG. 2) used for generating 3D media assets. In some embodiments, the 3D media asset may be associated with an owner, e.g., a creator of the 3D media asset and/or an entity digitally represented in the 3D media asset.

At 904, the control circuitry may determine to apply access control to the 3D media asset. For example, the control circuitry may receive input from a 3D media asset owner or other authorized user requesting to apply access control to the 3D media asset, or otherwise determine to apply access control to the 3D media asset, e.g., based on a profile or metadata associated with the 3D media asset and/or 3D media asset owner, or for any other suitable reason. For example, a particular 3D media asset owner may request a service provider associated with server 804 and/or media content source 802 to apply access controls to each media asset associated with the particular 3D media asset owner or specific 3D media assets associated with the asset owner.

At 906, the control circuitry may identify one or more attributes of one or more entities represented in the 3D media asset. Each of the one or more entities may respectively correspond to a digital representation of a person, an object or a structure. The control circuitry may identify the one or more attributes of the one or more entities in any suitable manner. For example, the control circuitry may employ image segmentation (e.g., semantic segmentation and/or instance segmentation) and classification to identify and localize different types or classes of entities in portion(s) of the 3D media asset, e.g., using any suitable machine learning model(s). In some embodiments, metadata of the 3D media asset, e.g., accessed at 902, may indicate locations and/or classifications of entities at various timestamps within the 3D media asset. In some embodiments, the control circuitry may prompt or otherwise receive input from the 3D media asset owner classifying particular portions of an entity as a particular attribute (e.g., a face or sub-portion of a face of a digital representation of a person shown in the 3D media asset).

At 908, the control circuitry may determine whether selection of one or more attributes of the one or more entities has been received. For example, the control circuitry may cause an interface (e.g., depicting an entity as shown in FIG. 4) to be displayed to a user indicating one or more attributes for each respective entity identified in the 3D media asset, and determine whether the input selecting a particular attribute of the entity has been received. In some embodiments, the control circuitry may recommend certain portions of an entity (e.g., entity 301 of FIG. 3) as selectable attributes. Such recommendation may be based on historical user selections of the asset owner or other similarly situated asset owners, and/or based on any other suitable information, e.g., referencing a database, analyzing websites or social network history to determine a critical portion of an entity. If such selection is received, processing may proceed to 908; otherwise processing may remain at 910 to wait for selection of an attribute. In some embodiments, an attribute may be automatically selected, e.g., one or more of the recommended attributes, rather than waiting for a user selection, or may be automatically selected if a user selection of an attribute is not received within a predefined period of time. In some embodiments, a particular audio portion (e.g., spoken by or otherwise associated with the identified entity of 3D media asset 300 of FIG. 3) of the 3D media asset may be identified and selected.

At 910, the control circuitry may generate a modified version of the 3D media asset by modifying the selected one or more attributes of the one or more entities. For example, the control circuitry may generate the modified or baseline 3D media asset by removing the identified attribute from the original version of the 3D media asset or otherwise altering the attribute (e.g., by modifying a size, shape, location, appearance or other characteristic(s) of the attribute). The control circuitry may determine the vertices, edges, faces, and/or beamformed spatial audio of one or more frames of the modified version of 3D media asset 300. For the particular identified attribute(s), e.g., the 2D or 3D portion specified by the asset owner, the control circuitry may set such attribute as blank or with a specific pattern (e.g., as a signature #DEADBEEF or specially coded or any other suitable pattern) during an encoding phase of the modified version of media asset 300. In some embodiments, such specific coding may be applying an offset to the depth parameter or any other suitable parameter or attribute of the modified version of 3D media asset 300, which may be a minor offset that may be difficult or impossible for a human observer to perceive. In some embodiments, the control circuitry may provide the user (e.g., asset owner) with the ability to specify his or her own patterning methodology or select one or more of the above-mentioned patterns.

In some embodiments, identification and/or selection of a portion or sub-portion of a 3D media asset that is to be modified may be based on liveliness features related to movement of one or more portions of the digital representation of an entity (e.g., entity 301 in 3D media asset 300). In some embodiments, the liveliness features of one or more entities and/or portions thereof to be modified may correspond to a particular gesture, e.g., a signature move widely known and associated with a particular celebrity.

At 912, the control circuitry may determine a 3D media asset policy. For example, the control circuitry may present to the 3D media asset owner, and receive selection of by the 3D media asset owner, an interface by which the 3D media asset owner can specify parameters of the policy. In some embodiments, selection of such policy may be received at step 904, 906 and/or 908. In some embodiments, the control circuitry may provide templates of parameters for policies of certain types of content, e.g., for live streaming content or on-demand content, and/or recommend certain parameters for certain types of 3D media assets. In some embodiments, the control circuitry may be configured to embed a seed certificate within 3D media asset 300, e.g., during a phase in which the 3D media asset is generated. Such seed certificate may include the policy of how 3D media asset 300 can be used as a default and/or any other suitable information, e.g., a default hardcoded certificate server address.

In some embodiments, a 3D media asset policy may comprise, and the control circuitry may allow selection and modification of, any suitable policy parameters, such as, for example, permitted consumption of the 3D media asset; permitted transmission of the 3D media asset for a particular server; permitted consumption of the 3D media asset for a requesting device type (e.g., adjusting the rendering accordingly); permitted consumption of the 3D media asset for particular capabilities of a requesting device; time duration limitations associated with the 3D media asset (e.g., expiring at a certain date); number of render limitations associated with the 3D media asset (e.g., only allow a particular number of free plays of the 3D media asset); or 6-DOF movement capability (e.g., orientation of the 3D media asset and/or adjacency of the 3D media asset with respect to other 3D media assets) limitations with respect to the 3D media asset. For instance, the policy may specify to maintain 2D movement capability but remove 3D 6-DOF movement capability, e.g., by removing movement prediction frames and/or relevant coarse geometry from VPCC as indicated by point-to-point and point-to-plane.

At 914, the control circuitry may generate metadata for the modified version of the 3D media asset. In some embodiments, the control circuitry may generate a separate container, e.g., comprising the metadata, for the modified (e.g., blank or cloaked or specially coded section) 3D media asset. Such metadata container may comprise, or otherwise indicate, the authentic data (e.g., the identified attribute, as present in the original 3D media asset 300 prior to the modification of 3D media asset 300). For example, the metadata container may specify a portion (e.g., a particular frame and/or location) within the modified version of media asset 300 at which the modified attribute is presented and specifies the attribute as such attribute was identified prior to the modification. Such metadata container may comprise an indication or instructions to a 3D media asset renderer of how to process the modified version of the 3D media asset to reconstruct the 3D media asset comprising the attribute as identified prior to the modifying. In some embodiments, the metadata container may comprise an indication of one or more characteristics of equipment used to capture imagery used for generating the 3D media asset or one or more characteristics of an environment in which the imagery was captured. For example, the one or more characteristics of the equipment may comprise at least one of an indication of a location of a camera in the environment, a location of a microphone in the environment, or a geometry of the camera.

In some embodiments, such metadata container may be encrypted separately from encryption of the modified version of 3D media asset 300, using any suitable encryption protocol (e.g., AES-128 and/or any other suitable technique). In some embodiments, the metadata may be included in or otherwise referenced or indicated in a manifest file usable to play the 3D media asset, e.g., as part of an adaptive bitrate streaming technique, such as, for example, the DASH protocol. In some embodiments, cryptographic techniques may be employed with respect to the modified version of the media asset and/or the metadata container, e.g., the control circuitry may generate a hash generated checksum, for use in verifying the modified version of the media asset and/or the metadata container. In some embodiments, the control circuitry may be configured to encrypt or lock the metadata container based on, e.g., specific data from the hardware, such as, for example, a trusted execution environment (TEE) such as, for example, ARM TrustZone or any other suitable TEE. In some embodiments, such cryptographic techniques and/or hardware security techniques may be specified in the policy for the 3D media asset.

At 916, the control circuitry may receive, from a client device (e.g., client 508 of FIG. a request to access at least a portion of the 3D media asset. The 3D media asset may be contained within a uniform total volumetric video stream, inserted into a 2D stream as an optional volumetric asset add-on, recalled on demand by the player, initiated by the consumer, and/or inserted into a 3D video stream at certain timestamps as a volumetric video asset.

At 918, the control circuitry may provide the modified version of the 3D media asset to the requesting device. In some embodiments, providing such modified version of the 3D media asset may occur prior to the determination at 920; alternatively, the modified version of the 3D media asset may be transmitted to the requesting device (e.g., client-side renderer 508 of FIG. 5). In some embodiments, the control circuitry may transmit to the requesting device a manifest file usable to request chunks or segments of the 3D media asset from a server (e.g., server 804 of FIG. 8 and/or server 602 of FIG. 6) using adaptive bitrate streaming, e.g., DASH protocols. In some embodiments, the manifest may comprise the metadata container generated at 914, or comprise a reference to the metadata container generated at 914, e.g., a URL by which the encrypted metadata container may be requested.

At 920, the control circuitry may determine, based on the policy associated with the 3D media asset, whether to enable access to at least a portion of the original 3D media asset. In some embodiments, the control circuitry may make this determination while the modified version of the 3D media asset is playing, such as, for example, prior to a timestamp at which the modified attribute is to appear or would otherwise have appeared. Alternatively, the control circuitry may make the determination of 920 prior to providing the modified version of the 3D media asset. In some embodiments, 920 may be performed in a similar manner as discussed in connection with FIG. 6 with respect to the license request at 603, license grant at 607 and license grant 609. For example, in response to determining a license has been received that indicates, based on the policy, that access to the requested portion of the original 3D media asset is enabled, processing may proceed to 922. On the other hand, if such license has not been received, or an indication is otherwise received indicating that access to the 3D media asset should not be enabled, processing may proceed to 924.

At 922, the control circuitry may transmit to the client device (e.g., 508 of FIG. 5) the metadata (e.g., generated at 914) comprising an indication of how to process the modified version of the 3D media asset to reconstruct the original 3D media asset comprising the attribute as identified prior to the modifying. For example, the metadata container may comprise an indication of a location and/or characteristics and/or timestamps associated with the original attribute, and the control circuitry, e.g., at the client-side device, may utilize such information to reconstruct the original, authentic 3D media asset (at 926). For example, the reconstruction of the original 3D media asset may be performed based on the processing the modified version of the 3D media asset specified by way of 922. If such attribute had been modified by omitting the attribute from the modified version of the 3D media asset, the control circuitry may cause the omitted attribute to be inserted into the reconstructed 3D media asset at an appropriate location and time. If such attribute had been modified by altering one or more characteristics of the attribute, the control circuitry may cause such modified attribute(s) to revert to its original form. In some embodiments, such metadata may have already been transmitted in encrypted form, and decryption of such encrypted metadata may be enabled in response to the determination at 920. In some embodiments, processing may proceed from 920 to 922 based at least in part on cryptographic verification or authentication techniques discussed herein. In some embodiments, 922 and/or 926 may occur while the modified version of the 3D media asset is being played, or while such modified version of the 3D media asset is not being played.

At 924, the control circuitry may deny the requesting client device access to the original version of 3D media asset and/or perform degradation of the modified version of the 3D media asset (if such media asset is playing). In some embodiments, the 3D media asset owner may be notified, e.g., via usage analytics 619 of FIG. 6, of such activity of 924 and/or 922 and 926. In some embodiments, 924 may occur based on failed cryptographic operations, e.g., a failed checksum operation. In some embodiments, at 924, access to both the original 3D media asset and the modified 3D media asset may be denied. Alternatively, at 924, the control circuitry may permit access to the modified version of the 3D media asset, e.g., for a predefined period of time, and/or may apply a degradation cycle, e.g., gradual degradation cycle. Such gradual degradation cycle may correspond to color loss, frame loss, dropped frames, only showing a base 2D version of the asset, and/or any other suitable degradation technique, at the player level such that unauthorized assets eventually may not be rendered anymore by the player at client-side renderer 508.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   identifying an attribute of an entity represented in a three-dimensional (3D) media asset;
   generating a modified version of the 3D media asset by modifying the attribute of the entity;
   receiving, from a client device, a request to access at least a portion of the 3D media asset;
   determining, based on a policy associated with the 3D media asset, whether to enable access to the at least a portion of the 3D media asset, wherein the policy indicates a particular portion of the 3D media asset should be excluded;
   in response to determining to enable access to the at least a portion of the 3D media asset, transmitting to the client device an indication of how to process the modified version of the 3D media asset to reconstruct the 3D media asset comprising the attribute as identified prior to the modifying;
   cause the client device to generate for display the 3D media asset based on the processing of the modified version of the 3D media asset, wherein, based on the policy, the particular portion of the 3D media asset is caused to not be displayed at the client device.

2. The method of claim 1, wherein the 3D media asset is a volumetric media asset, and the entity is a digital representation of a person, an object or a structure.

3. The method of claim 1, wherein the entity is a digital representation of a person, and the attribute corresponds to one or more liveliness features related to movement of one or more portions of the digital representation of the person in the 3D media asset.

4. The method of claim 1, further comprising:
   generating metadata for the modified 3D media asset that comprises the indication, wherein the indication specifies a portion of the modified version of the media asset at which the modified attribute is presented and specifies the attribute as identified prior to the modifying, and the metadata is indicated in a manifest file usable to play the 3D media asset.

5. The method of claim 4, further comprising:
   encrypting the metadata prior to transmission to the client device;
   generating a hash generated checksum with respect to the modified version of the media asset and the metadata, wherein determining to enable access to the at least a portion of the 3D media asset comprises determining that a checksum operation performed based on the hash generated checksum is successful.

6. The method of claim 4, wherein the metadata further comprises an indication of one or more characteristics of equipment used to capture imagery used for generating the 3D media asset or one or more characteristics of an environment in which the imagery was captured.

7. The method of claim 6, wherein the one or more characteristics of the equipment comprise at least one of an indication of a location of a camera in the environment, a location of a microphone in the environment, or a geometry of the camera.

8. The method of claim 1, wherein the attribute is identified in response to receiving input, from an owner of the 3D media asset, indicating that the attribute should be modified for the modified version of the 3D media asset.

9. The method of claim 1, further comprising:
   embedding a seed certificate into the 3D media asset, wherein the seed certificate comprises the policy associated with the 3D media asset; and
   determining, based on the policy associated with the 3D media asset, whether to enable access to the at least a portion of the 3D media asset comprises:
      determining whether a license has been received that indicates, based on the policy, whether the at least a portion of the 3D media asset is enabled; and
      in response to determining the license has not been received, causing the modified version of the 3D media asset to be displayed at the client device.

10. The method of claim 1, wherein the policy indicates one or more of:
    permitted consumption of the 3D media asset;
    permitted transmission of the 3D media asset for a particular server;
    permitted consumption of the 3D media asset for a requesting device type;
    permitted consumption of the 3D media asset for particular capabilities of a requesting device;
    time duration limitations associated with the 3D media asset;
    number of render limitations associated with the 3D media asset; or
    six degrees of freedom (6-DOF) movement capability limitations with respect to the 3D media asset.

11. The method of claim 1, further comprising:
    in response to determining, based on the policy, not to enable access to the 3D media asset, causing the client device to generate for display the modified version of the 3D media asset with a gradual degradation cycle in which audio or visual attributes of the modified version of the 3D media asset are gradually degraded for a period of time and display of the modified version of the 3D media asset is ceased after the period of time.

12. A computer-implemented system comprising:
    memory;
    control circuitry configured to:
       identify an attribute of an entity represented in a three-dimensional (3D) media asset;
       generate a modified version of the 3D media asset by modifying the attribute of the entity;
       receive, from a client device, a request to access at least a portion of the 3D media asset;
       determine, based on a policy associated with the 3D media asset and stored in the memory, whether to enable access to the at least a portion of the 3D media asset, wherein the policy indicates a particular portion of the 3D media asset should be excluded;
       in response to determining to enable access to the at least a portion of the 3D media asset, transmit to the client device an indication of how to process the modified version of the 3D media asset to reconstruct the 3D media asset comprising the attribute as identified prior to the modifying; and cause the client device to generate for display the 3D media asset based on the processing of the modified version of the 3D media asset, wherein, based on the policy, the particular portion of the 3D media asset is caused to not be displayed at the client device.

13. The system of claim 12, wherein the 3D media asset is a volumetric media asset, and the entity is a digital representation of a person, an object or a structure.

14. The system of claim 12, wherein the entity is a digital representation of a person, and the attribute corresponds to one or more liveliness features related to movement of one or more portions of the digital representation of the person in the 3D media asset.

15. The system of claim 12, wherein the control circuitry is further configured to:

generate metadata for the modified 3D media asset that comprises the indication, wherein the indication specifies a portion of the modified version of the media asset at which the modified attribute is presented and specifies the attribute as identified prior to the modifying, and the metadata is indicated in a manifest file usable to play the 3D media asset.

16. The system of claim 15, wherein the control circuitry is further configured to:

encrypt the metadata prior to transmission to the client device;

generate a hash generated checksum with respect to the modified version of the media asset and the metadata; and determine to enable access to the at least a portion of the 3D media asset by determining that a checksum operation performed based on the hash generated checksum is successful.

17. The system of claim 15, wherein the metadata further comprises an indication of one or more characteristics of equipment used to capture imagery used for generating the 3D media asset or one or more characteristics of an environment in which the imagery was captured.

18. The system of claim 17, wherein the one or more characteristics of the equipment comprise at least one of an indication of a location of camera in the environment, a location of a microphone in the environment, or a geometry of the camera.

19. The system of claim 12, wherein the control circuitry is configured to identify the attribute in response to receiving input, from an owner of the 3D media asset, indicating that the attribute should be modified for the modified version of the 3D media asset.

20. The system of claim 12, wherein the control circuitry is further configured to:

embed a seed certificate into the 3D media asset, wherein the seed certificate comprises the policy associated with the 3D media asset; and determine, based on the policy associated with the 3D media asset, whether to enable access to the at least a portion of the 3D media asset by:

determining whether a license has been received that indicates, based on the policy, whether access to the at least a portion of the 3D media asset is enabled; and in response to determining the license has not been received, causing the modified version of the 3D media asset to be displayed at the client device.

* * * * *